Nov. 9, 1965 T. A. WETZEL ETAL 3,217,331

METHOD OF RECORDING A CONTROL PROGRAM

Original Filed May 18, 1959 8 Sheets-Sheet 1

INVENTORS
Theodore A. Wetzel
BY Thomas A. Stoner
Emory J. Wuetschel
Attorney

METHOD OF RECORDING A CONTROL PROGRAM

Original Filed May 18, 1959

8 Sheets-Sheet 2

INVENTORS
Theodore A Wetzel
Thomas A. Stoner
BY
Elmer J. Wetzel
Attorney

INVENTORS
Theodore A. Wetzel
Thomas A. Stoner
BY
[signature]
Attorney

METHOD OF RECORDING A CONTROL PROGRAM

Original Filed May 18, 1959

INVENTORS
Theodore A. Wetzel
BY Thomas A Stoner
Elroy J. Wutschel
Attorney

INVENTORS
Theodore A Wetzel
Thomas A. Stoner
BY
Attorney

INVENTORS
Theodore A. Wetzel
Thomas A. Stoner
BY
Elmer J. Wetschel
Attorney

Nov. 9, 1965 T. A. WETZEL ETAL 3,217,331

METHOD OF RECORDING A CONTROL PROGRAM

Original Filed May 18, 1959

8 Sheets-Sheet 7

INVENTORS
Theodore A. Wetzel
Thomas A. Stoner
BY
Attorney

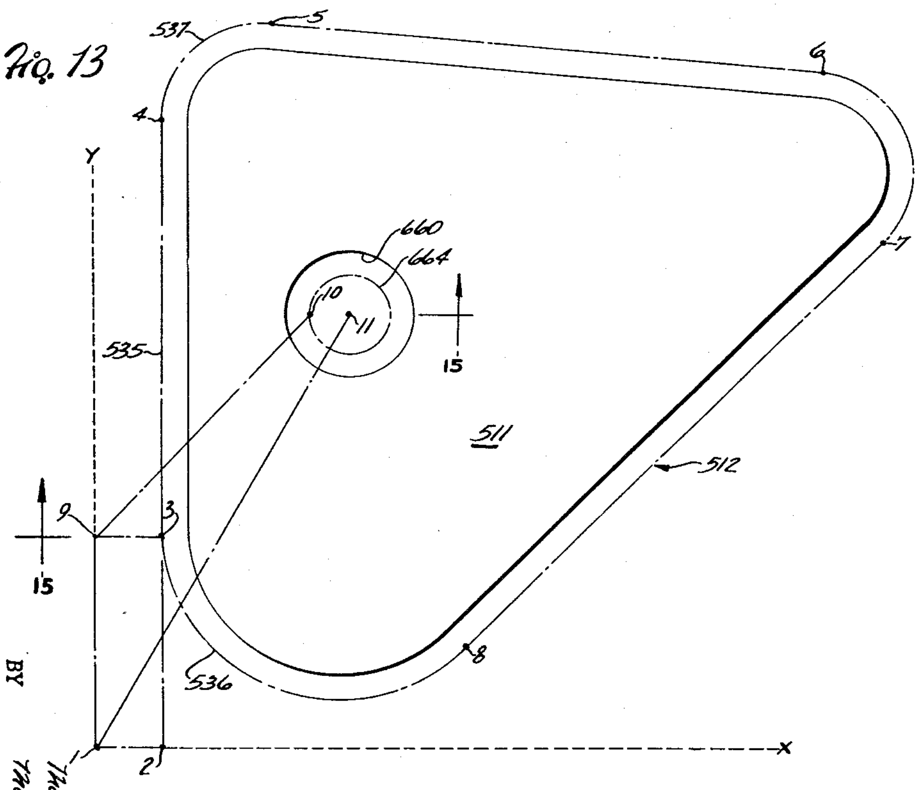
FIG. 13
| PT. | X | Y | Z | FD. RT. | R. | Slope | Z. DIR. |
|---|---|---|---|---|---|---|---|
| 1 | 0.0000 | 0.0000 | 0.2500 | | | | |
| 2 | 1.0000 | 0.0000 | 0.2500 | 45" | | 0° | |
| 3 | 1.0000 | 4.2500 | 0.2500 | 45" | | 90° | |
| 4 | 1.0000 | 9.7500 | 0.2500 | 45" | | 90° | |
| 5 | 2.8807 | 11.4943 | 0.2500 | 45" | 1.5" | | |
| 6 | 11.2834 | 10.7528 | 0.2500 | 45" | | 355° | |
| 7 | 12.3683 | 7.7721 | 0.2500 | 45" | 1.5" | | |
| 8 | 6.5481 | 1.9519 | 0.2500 | 45" | | 225° | |
| 3 | 1.0000 | 4.2500 | 0.2500 | 45" | 3.0" | | |
| 9 | 0.0000 | 4.2500 | 0.2500 | 45" | | 180° | |
| 9Z | 0.0000 | 4.2500 | 1.5000 | 45" | | | + |
| 10 | 3.3750 | 7.0000 | 1.5000 | 45" | | 32.32° | |
| 10 | 3.3750 | 7.0000 | 1.5000 | 45" | .6250 | | |
| 10Z | 3.3750 | 7.0000 | 0.8750 | 45" | | | — |
| 11 | 4.0000 | 7.0000 | 1.5000 | 45" | | 0° | |
| 11Z | 4.0000 | 7.0000 | 1.5000 | 45" | | | + |
| 1 | 0.0000 | 0.0000 | — | 45" | | 240.27° | |
| 1Z | 0.0000 | 0.0000 | 1.5000 | 45" | | | |
| 1 | 0.0000 | 0.0000 | 0.2500 | 45" | | | — |
FIG. 14
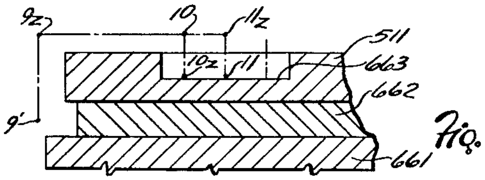
FIG. 15
INVENTORS
Theodore A. Wetzel
Thomas A. Stoner
BY
[signature]
Attorney United States Patent Office 3,217,331

Patented Nov. 9, 1965

3,217,331

METHOD OF RECORDING A CONTROL PROGRAM

Theodore A. Wetzel and Thomas A. Stoner, Brookfield, Wis., assignors to Kearney & Trecker Corporation, West Allis, Wis., a corporation of Wisconsin Original application May 18, 1959, Ser. No. 813,958, now Patent No. 3,127,613, dated Mar. 31, 1964. Divided and this application July 9, 1963, Ser. No. 293,726
5 Claims. (Cl. 346—1)

This patent application constitutes a division of our co-pending U.S. Patent application, Serial No. 813,958, now U.S. Patent 3,127,613, and relates generally to an improved method for recording a program of machine operations for the purpose of establishing a record which may be employed for controlling the machine to cause the latter to operate in accordance with the recorded information.

Many automated production facilities have been designed to be operated in response to recorded information. In such an arrangement the control data is recorded and the record is subsequently employed for controlling the operation of the facility. The particular recorded operation may then be repeated by repeatedly utilizing the information that has been stored on the record.

For example, data may be recorded on either magnetic or punched tape for controlling a specific machine tool operation. When it is desired to perform the recorded operation, the record is played back and the information obtained therefrom is employed for controlling the relative movement between a cutting tool and a workpiece to perform the required machining operation on the workpiece. The same machine operation may be repeated by repeating the playback of the record and utilizing the information stored thereon for controlling the operation of the machine to produce the desired relative movement between the cutting tool and the workpiece.

The preferred system for preparing the control record is to feed the information concerning the operation to be performed into a computer or similar equipment which records the data in a form that may be subsequently employed for controlling the operation of the machine. For example, the information on a drawing of a workpiece which is to be machined may be converted to locate various points of the workpiece in relation to the datum or zero point of "X" and "Y" coordinates. This data is then utilized in the computer for preparing the record. However, the method for recording such control data and for converting it into a form which may be employed for actuating the control circuit of the machine to regulate its operation in the required manner has been complex and relatively expensive.

It is therefore a general object of the present invention to provide an improved method for creating a record which may be subsequently employed for controlling the operation of a machine.

Another object of the present invention is to provide a relatively inexpensive and simple method for recording data which may be subsequently utilized, from the record, for controlling the operation of a machine.

Another object is to provide a method for creating a record which may be played back for controlling the operation of a machine.

According to this invention an improved method is provided for recording data to establish a record which may be subsequently played back to furnish control signals for regulating the operation of a machine to cause it to perform the specified operation. The method comprises of resolving a single input of numerical data representative of a cutter path of travel to obtain two sine-cosine related variable components. The two components are utilized to produce signals which are converted to pulses and recorded on a record, such as magnetic tape. The signals are related to a reference signal which is likewise recorded on the record. Each of the two components represents the movement of one of two machine tool slides that are represented as moving along the axes of "X" and "Y" coordinates since the path of travel of one of the slides is perpendicular to the path of travel of the other. It is apparent that a combined movement of the two slides will produce a resultant movement in a direction that is displaced angularly from both of the "X" and "Y" axes.

Each of the two variable components are adapted to produce a series of pulses on an associated channel on the record with the pulse varying in frequency in accordance with the variation in the rate of rotation of the component. One of the two components is adapted to regulate the frequency of the pulses for the machine tool slide motion along the "X" axis and is therefore referred to as the "X" component with the pulses being recorded on the "X" channel of the record. The other component is adapted to regulate the frequency of the pulses for the machine tool slide motion along the "Y" axis and is therefore referred to as the "Y" component with the pulses being recorded on the "Y" channel of the record. In addition to the "X" and "Y" channels, the record is provided with a third channel, which is termed the reference channel for receiving reference pulses that are recorded at a constant predetermined frequency at the same time that the pulses are being recorded on the "X" and "Y" channels.

On playback, the frequency of the pulses on the "X" and "Y" channels is compared with the constant frequency of the reference channel and a deviation therefrom produces a signal that serves to regulate the machine tool slide motion. Thus, if the frequency on either the "X" or the "Y" channels corresponds to the frequency of the reference channel, the corresponding machine tool slide will remain at rest. A frequency on either the "X" or "Y" channels that is greater than the frequency on the reference channel calls for a slide motion in one direction while a frequency on the "X" or "Y" channels that is less than the reference frequency establishes a slide motion in the opposite direction. Furthermore, the rate of travel of the "X" and "Y" machine tool slides varies directly as the frequency of the "X" and "Y" channels respectively varies from the reference channel. Thus, a frequency on the "X" channel which is greater than the frequency of the reference channel indicates a movement of the "X" machine tool slide in one direction and the greater the frequency on the "X" channel above the frequency of the reference channel, the faster the "X" slide will travel. On the other hand, a frequency on the "X" channel which is less than the reference frequency indicates a movement of the "X" slide in the opposite direction at a rate of travel which increases as the frequency of the pulses on the "X" channel decreases below the reference frequency. By thus controlling the movement of the machine tool slides, the relative movement between a cutting tool and a workpiece can be established to complete the desired machining operations on the workpiece.

The foregoing and others objects of the invention, which will become more fully apparent from the following detailed specification, may be achieved by means of the exemplifying embodiments, depicted in and described in connection with the accompanying drawings, in which:

FIG. 13 is a plan view of a workpiece shown orientated in the positive quadrant as related to the "X" and "Y" axes of Cartesian coordinates and showing the points which are to be used to describe the figure numerically in relation to the "X" and "Y" coordinates;

FIG. 14 is a chart in which the "X" and "Y" coordinates of the various points of the workpiece configuration shown in FIG. 13 are given; and, FIG. 15 is a fragmentary view in vertical section taken along the plane represented by the line 15—15 in FIG. 13, showing the workpiece supported on a table of a machine tool, the showing being made for the purpose of illustrating the path of travel of the cutter when controlled from "Z" information.

Figure 1:
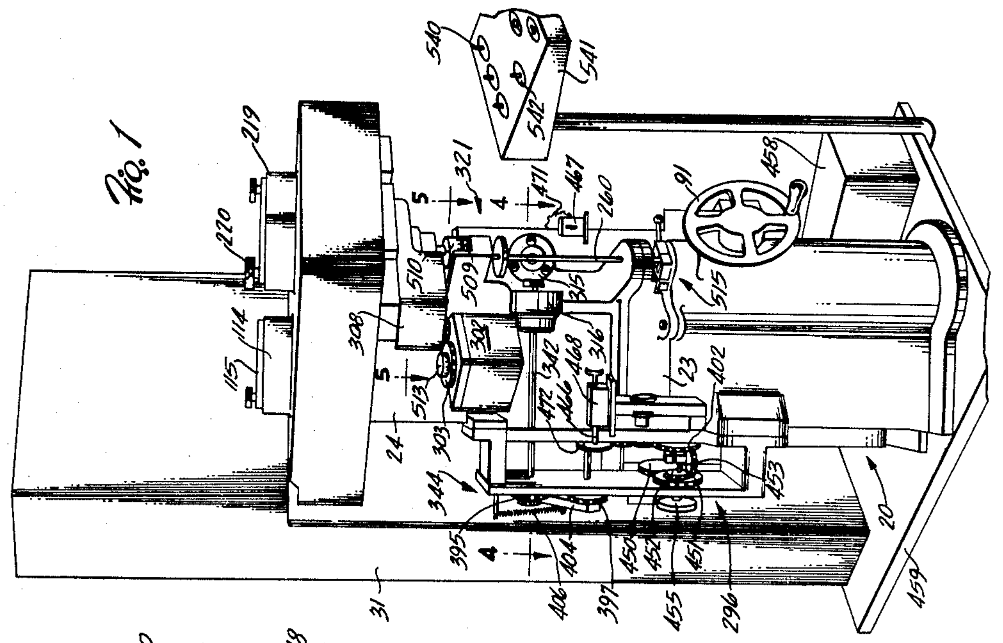
FIGURE 1 is a left, front perspective view of apparatus which may be utilized to practice the teachings of the present invention.
Figure 2:
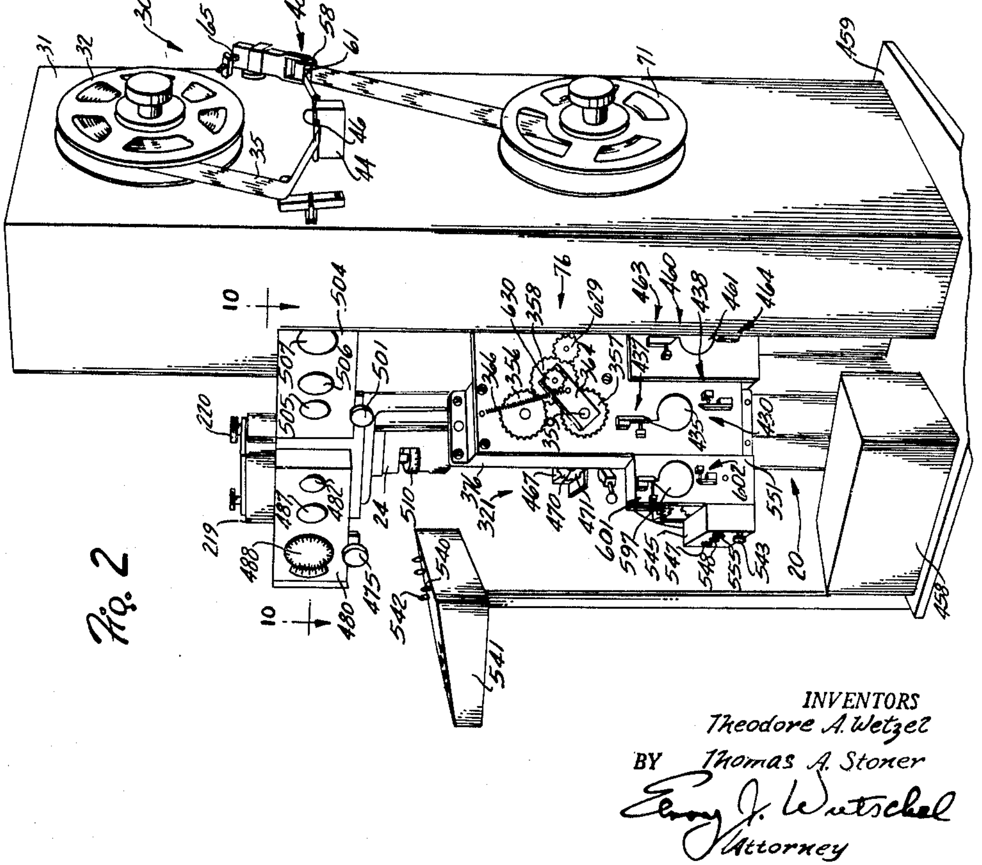
FIG. 2 is a right, rear perspective view of the apparatus shown in FIG. 1.
Figure 3:
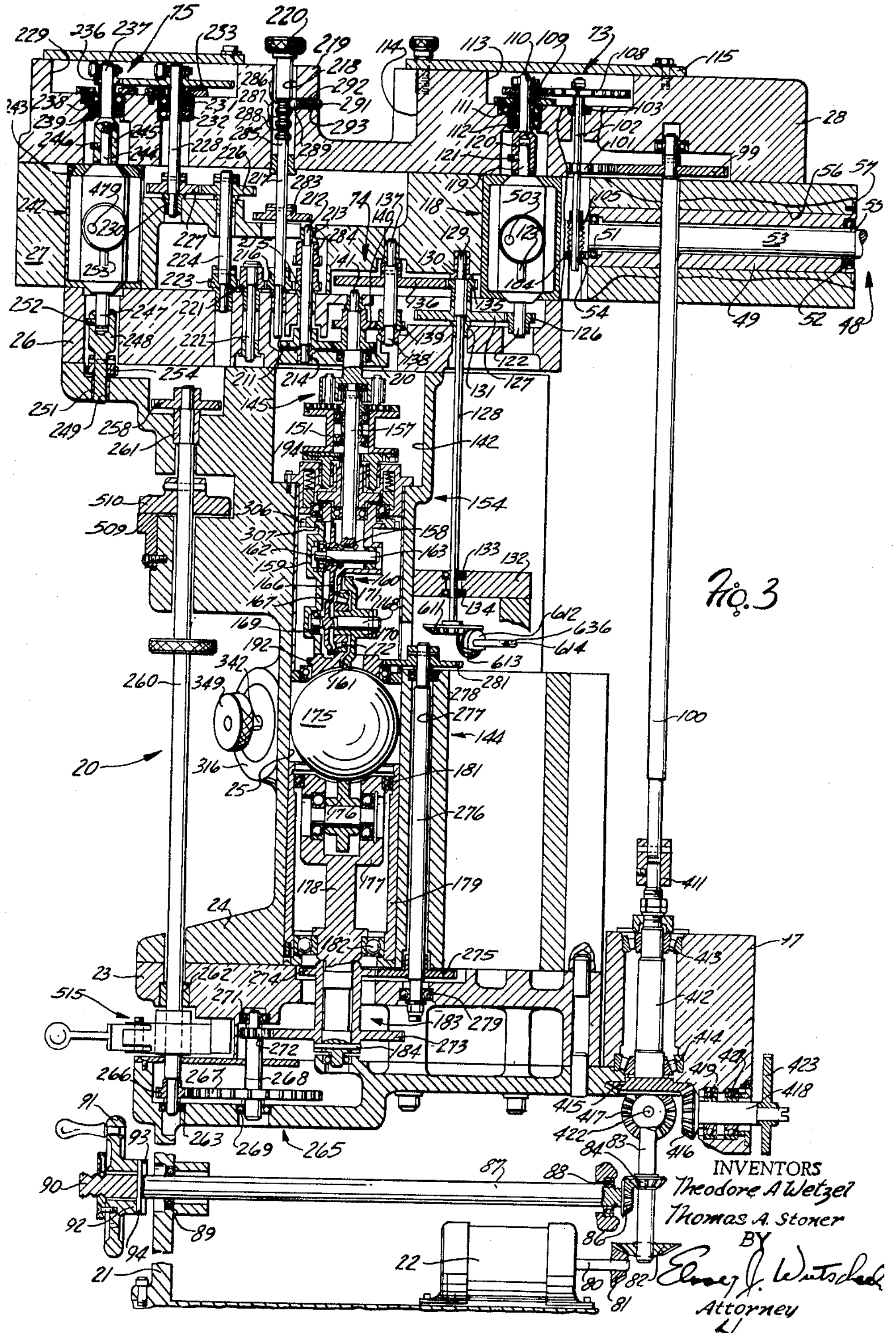
FIG. 3 is a view in vertical section through the column of the apparatus taken in a plane through the center of the mechanical resolver to show the various transmission drives, the tape transport housing having been omitted for the purpose of clarity, the showing being made as it would appear from the right side of the apparatus.

Reference is now made more particularly to the drawings and specifically to FIGS. 1, 2 and 3 which illustrate a recording apparatus which may be utilized to practice the teachings of the present invention. The exemplary embodiment includes an upstanding pedestal or column generally identified by the reference numeral 20 and having a hollow base casting 21 which encloses an electric motor 22 as shown in FIG. 3. The hollow base casting 21 supports a built up transmission housing that comprises a lower casting 23 secured to the top surface of the base casting 21, and intermediate or main casting 24 having an axial bore 25 and mounted on the top surface of the lower casting 23, a lower transmission casting 26 supported on the top surface of the intermediate casting 24, an upper transmission casting 27 secured to the top surface of the casting 26, and a top casting 28 of generally rectangular configuration which is mounted upon the top surface of the upper transmission casting 27. The several castings carried by the base casting 21 cooperate to form a unitary housing for enclosing a transmission mechanism.

The control information developed by the apparatus of the present invention is recorded on a magnetic tape 35 as it passes over a recording surface 46 of a recording head 44. The magnetic tape 35 is passed through the recording head 44 by a tape transport mechanism of conventional construction that is generally identified by the reference numeral 30 and is carried by an upstanding hollow housing 31. The transport mechanism includes a tape supply reel 32 from which the tape is drawn for passage through the recording head and after passing through the recording head 44 the tape is wound into a take-up reel 71.

The operation of the apparatus requires that the tape 35 travel past the recording surface 46 at a rate that is maintained in an exact relation to the rate of operation of the transmission mechanism which regulates the recording of the information on the tape. In order to achieve this relationship, the power for moving the tape 35 past the recording surface 46 is derived from such transmission mechanism by means of a capstan drive 48.

The capstan drive 48 comprises a tubular spindle carrier 49, as shown in FIG. 3, in which antifriction bearings 51 and 52 are mounted within suitable recesses formed in either end thereof. The bearings 51 and 52 serve to rotatively support a capstan spindle 53, the inner end of which is provided with a worm gear 54 which is keyed to the capstan spindle 53 for rotation therewith. A snap ring 55 is fixed to the capstan spindle 53 adjacent to the bearing 52 for maintaining the assembly within the carrier 49. The assembled carrier is inserted within a horizontal bore 56 provided in the upper transmission casting 27. The other end of the tubular carrier 49 is provided with an annular flange 57 through which bolts extend into threaded engagement with suitable threaded openings in the casting 27 to secure the carrier 49 within the bore 56.

The outer extending portion 58 of the capstan spindle 53 extends outwardly of the carrier 49 and through the housing 31, as clearly shown in FIG. 2. The capstan spindle 53 is driven by the transmission mechanism through a power train to be subsequently described and its extending end 58 is adapted to be in frictional engagement with the tape 35 so that as the extending end 58 of the capstan spindle 53 is rotated, it operates to draw the tape 35 past the recording surface 46 while the recording head 44 is being actuated by the apparatus to record the control data on the tape 35.

The peripheral surface of the end 58 of the capstan spindle 53 is provided with a highly polished surface over which the magnetic tape is entrained. The tape 35 is maintained in firm engagement with the polished extending end 58 of the capstan spindle 53 by a loading roller 61 which is urged by a compression spring 65 toward the extending end 58 to maintain the magnetic tape 35 in firm frictional driving engagement with the extending end 58, the magnetic tape passing between the extending end 58 and the loading roller 61.

In operation, the spindle 53 is rotated in a clockwise direction, as viewed in FIG. 2, to move the magnetic tape 35 across the recording surface 46 of the recording head 44 at the desired rate. As the extending end 58 rotates with the spindle 53, it operates to draw the tape off of the supply reel 32 and against the torque of a motor (not shown) that is associated with the supply reel 32. From the capstan drive 48, the processed magnetic tape is directed to the take-up reel 71 which is urged in a rotary movement by a suitable motor (not shown) to wind the tape about the reel. Therefore, as the capstan drive 48 operates to move the magnetic tape over the recording surface 46 of the recording head 44 the processed tape is wound on the reel 71, with the torque that is applied to the reel 71 being only sufficient to maintain a very slight tension on the tape.

The recording head 44 is comprised of a plurality of sections with each section functioning to record information on a separate channel of the magnetic tape 35. A separate channel is recorded on the tape for each machine tool slide that is to be controlled in response to the recorded information, and in addition, another channel serves to receive a reference signal with which the control signals on the tape for the machine tool slide are compared to determine the required slide motion. Other channels may likewise be provided for recording pertinent information. For the illustrated embodiment of the present invention it will be assumed that the recording and playback will be performed with the magnetic tape traveling through the recording head 44 at a rate of 1⅞" per second, and a reference frequency of 60 cycles per second is recorded on the tape.

Figures 6, 8:
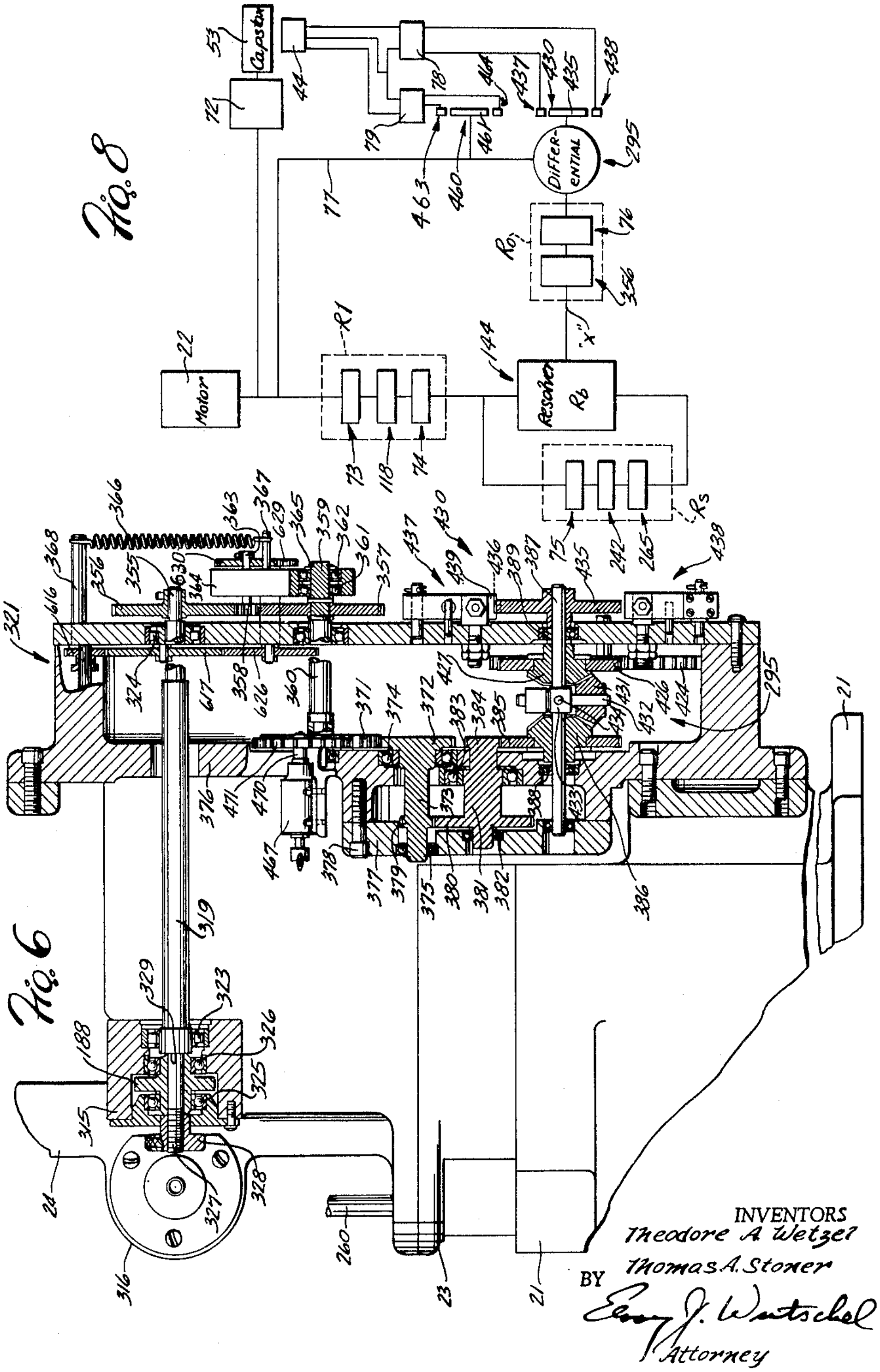
FIG. 6 is a fragmentary view partly in vertical section and partly in elevation taken in a plane represented by the line 6—6 in FIG. 7 to illustrate the take-off drive from the sphere to the "X" mechanical pulser.
FIG. 8 is a schematic block diagrammatic representation of the basic components employed in the present invention operatively connected to record an "X" channel and the reference channel on magnetic tape.

Reference is now made to FIG. 8 which presents a diagrammatic illustration of the basic components of the apparatus of the present invention connected to produce control data for regulating the motion of the machine tool slide along the "X" axis. All of the power for actuating the several components is derived from the constant speed motor 22. In the diagram of FIG. 8, the various components are represented diagrammatically and are interconnected by lines which indicate a driving connection between the components.

Thus, the motor 22 is connected to drive the capstan spindle 53 through a transmission 72 which operates to reduce the output of the motor 22 for rotating the capstan spindle 53 at the required rate to obtain the desired rate of travel of the magnetic tape 35 past the recording head 44.

As previously mentioned, the information which is recorded is produced by the operation of the mechanical resolver which is generally identified in FIG. 8 as well as in FIG. 3 by the reference numeral 144. The particular mechanical resolver illustrated in the drawings is the type known as a ball transmission which will be subsequently described in greater detail. Briefly stated, the ball transmission comprises a sphere mounted for rotation about an infinite number of axes and from which originate the drives for producing the data that is to be recorded. An input to the resolver serves to rotate the sphere, which, in turn, resolves the input into two components in a sine-cosine relationship, one component serving to actuate the mechanism for recording the "X" axis of motion while the other component actuates the mechanism for the "Y" axis of motion with only the drive for the "X" axis of motion being depicted in FIG. 8. The sphere is rotated by a drive wheel which is in frictional engagement with the sphere, the drive wheel being rotated about its own axis by the input to the resolver. In addition, the drive wheel may be steered to change the position of its axis and thereby change the position of the axis of rotation of the sphere to vary the distribution of the input between its two components with the distribution between the two components always remaining in a sine-cosine relationship.

It is therefore apparent that the resolver 144 requires two inputs, one of which functions to rotate the sphere and the other of which functions to change its axis of rotation. To this end, the motor 22 is connected to drive the reduction transmission R1 the output of which is connected to effect rotation of the sphere of the resolver 144 and thereby constitutes the input which is resolved by the resolver 144 into the two components that represent the motion along the "X" and "Y" axes. The output of the transmission is also connected to drive the steering reduction transmission R*s* which, in turn, is connected to the resolver 144 to provide power steering of the drive wheel for varying the distribution of the input between its two components. Thus, the transmission R1 reduces the speed of the output of the motor 22 and this reduced output of the motor 22 constitutes the input which is divided into the two components by the resolver 144. In addition, the speed of the output of the transmission R1 is further reduced by a transmission R*s* and the output of the latter is employed for adjusting the resolver 144 to vary its distribution of the input amongst its two components.

The reduction transmissions R1 and R*s* are each actually comprised of three independent transmissions that function in conjunction with each other to achieve the desired results. Thus, the transmission R1 incorporates a change gear transmission generally identified by the reference numeral 73 and which comprises a plurality of gears adapted to be changed in well known manner to vary the gear ratio. The change gear transmission 73, in turn, is connected to drive an infinitely variable speed changer 118 which in the particular embodiment is adapted to either increase or decrease the output speed of the change gear transmission. The reduction transmission R1 also includes a fixed gear transmission 74 in which the transmission ratio is not adjustable.

In like manner, the steering transmission R*s* comprises three independent transmissions for producing the desired speed ratios in the drive for adjusting the resolver 144. Thus, the output of the reduction transmission R1 is directed to a change gear transmission 75 which comprises a plurality of replaceable gears for varying the gear ratio. From the change gear transmission 75 the drive is directed to an infinitely variable speed changer 242 which is similar in construction and operation to the speed changer 118 of the reduction transmission R1. From the speed changer 242 the drive continues to a fixed gear transmission 265 that connects it to the resolver 144 for adjusting the latter to vary the distribution of its input amongst its two components.

As previously mentioned, only the "X" drive is illustrated in FIG. 8 as emanating from the resolver 144 but it is to be understood that an identical drive train is actuated by the resolver 144 for the "Y" axis of motion as will be subsequently described. The "X" component of the resolver 144 is directed to a reduction transmission R*o*, and the line in FIG. 8 which represents the connection between the resolver 144 and the transmission R*o* is identified by the letter X to indicate that it is the "X" component of the resolver. The transmission R*o* comprises a change gear 356 and a fixed gear transmission 76 which connects with one side of a differential mechanism that is generally identified by the reference numeral 295. The input to the differential mechanism 295 by the "X" component of the resolver 144 through the transmission R*o* is compared with a reference input of a constant speed that is directed to the differential mechanism from the motor 22. In FIG. 8, the connection from the motor 22 to the differential mechanism 295 is represented by a line which is identified by the reference numeral 77.

The differential mechanism 295 algebraically adds the reference input and the "X" component input and this algebraic sum constitutes the output of the differential mechanism 295 which is recorded in the form of pulses at a frequency which varies in accordance with the variation of the output of the differential mechanism. In order to produce these pulses for recording on the magnetic tape, the output of the differential mechanism 295 is connected to drive a mechanical pulsing mechanism which is generally identified by the reference numeral 430 and which is connected to actuate an electronic flip-flop circuit 78 that produces the pulses which are recorded on the magnetic tape, these pulses appearing on the magnetic tape as changes in polarity or alternate north and south poles on the tape.

The actuation of the flip-flop circuit 78 is produced by a pair of normally closed switches 437 and 438 that are operated by a disc cam 435 as the latter is rotated by the output of the differential 295. Actuation of one of the switches causes the flip-flop circuit to produce a positive impulse for recording on the magnetic tape while actuation of the other switch produces a negative impulse. It is apparent, therefore, that the frequency of the pulses depends upon the rate of rotation of the disc cam 435. As the output of the differential mechanism 295 increases the rate of rotation of the disc cam 435, the frequency of the pulses increases accordingly, and as the output of the differential mechanism 295 decreases the rate of rotation of the disc cam 435, the frequency of the pulses recorded on the tape will likewise decrease.

At the same time that the "X" axis pulses are being recorded in response to the operation of the "X" mechanical pulser 430, a reference mechanical pulser generally identified by the reference numeral 460 is being operated at a constant rate by the motor 22. It will be noted in FIG. 8, that the reference mechanical pulser 460 is connected to be driven from the drive train that transmits the reference input to the differential mechanism 295. The drive is connected to rotate a disc cam 461 which operates to actuate two switches 463 and 464 for reversing the polarity produced by a flip-flop circuit 79 to which the switches 463 and 464 are connected. The reference mechanical pulser 460 is identical in construction and operation to the pulser 430 but instead of being operated at a variable rate as is the pulser 430, the reference pulser is operated at a constant rate by the constant speed motor 22. The flip-flop circuit 79 is connected to a separate section of the recording head 44 for the purpose of recording a reverse polarity each time one of the switches 463 and 464 is actuated in response to the operation of the disc cam 461. However, since the disc cam 461 is being rotated at a constant rate, the changes in polarity which constitute the pulses on the magnetic tape will be of a constant frequency in contrast to the variation in the frequency of the pulses produced by the "X" flip-flop circuit 78, the latter pulses being recorded on the channel while the pulses in response to the operation of the flip-flop circuit 79 are recorded on a second channel.

On playback, the frequency of the pulses recorded on the "X" channel of the magnetic tape by operation of the "X" pulsing mechanism 430 is compared with the constant frequency of the pulses recorded on the reference channel of the tape by the operation of the reference pulsing mechanism 460 and the difference between these two frequencies determines the motion of the machine tool slide along the "X" axis.

Thus, for the purpose of the present description it will be assumed that the reference pulser 460 is operated by the motor 22 at a rate to produce the recording of 60 pulses per second on the reference channel of the magnetic tape 35. At the same time, the output of the motor 22 is directed to the reference input of the differential mechanism 295 and is driving it at a speed which will operate the pulsing mechanism 430 at a rate to produce pulses for recording on the "X" channel of the tape at a frequency of 60 cycles per second. Therefore, in the absence of any other influence, the reference input to the differential mechanism 295 will cause the differential to operate the "X" pulsing mechanism at a rate to produce 60 pulses per second for recording on the tape and since the reference pulses are being produced by the pulsing mechanism 460 at the same frequency, there is correspondence so that the record calls for no motion along the "X" axis. In other words, the record indicates that the machine tool slide along the "X" axis is at rest. There must be a deviation in the frequency of the pulses on the "X" channel of the tape from the frequency of the pulses on the reference channel to produce slide motion on playback.

However, the frequency of the pulses produced by the mechanism 430 may be varied by introducing the "X" component of the resolver 144 into the differential mechanism 295 to either add or subtract from the reference input into the differential 295, depending upon the direction of rotation of "X" input. An "X" input which subtracts from the reference input to the differential will cause the pulsing mechanism 430 to produce pulses at a frequency of less than 60 per second to indicate movement of "X" machine tool slide in one direction which may be termed the negative direction in the present description. Furthermore, the greater the deviation of the frequency of the "X" pulses in a decreasing direction from the reference frequency of 60 cycles per second, the faster the machine tool slide will be caused to travel in the negative direction upon playback of the record.

On the other hand, if the "X" component of the resolver 144 is rotating in a direction to add to the reference input of the differential mechanism 295, the output of the differential 295 will drive the mechanical pulser 430 at a rate to produce pulses for recording on the magnetic tape at a frequency that is greater than the frequency of the reference pulses to call for a movement of the machine tool slide in the positive direction along the "X" axis. Under such circumstances, in the present embodiment, the "X" pulses will be recorded at a frequency greater than 60 cycles per second, and the greater the frequency of the "X" channel pulses above 60 cycles per second, the faster the machine tool slide will travel in the positive direction in response to the control produced by the record upon playback.

The specific construction of the apparatus is depicted in the drawings and reference is now made more particularly to FIG. 3 which illustrates the arrangement of the ball transmission 144. As previously mentioned, power for driving the apparatus is derived from the motor 22 which is mounted in the hollow base casting 21 with its shaft 80 extending in a horizontal plane. The motor shaft 80 is provided with a bevel gear 81 which is disposed in meshing engagement with a bevel gear 82 secured to the lower end of a vertically extended primary drive shaft 83. The primary drive shaft 83 may be also rotated manually and to this end is provided with a bevel gear 84 which has meshing engagement with a bevel gear 86 secured to the end of a horizontally disposed shaft 87. The shaft 87 is journalled in a pair of antifriction bearings 88 and 89 and extends outwardly beyond the wall of the base casting 21. A handwheel 91 is rotatably mounted on an extending end 90 of the shaft 87 and may be manipulated for rotating the drive shaft 83. The handwheel 91 has a hub portion 92, the end of which is provided with a diametrical groove or slot 93 that is disposed to receive the outwardly extending ends of a pin 94 that is secured in the shaft 87 for establishing a driving connection between the handwheel 91 and the shaft 87. The handwheel 91 is arranged to be moved axially on the end 90 of the shaft 87 into an engaged position, as shown in FIG. 3, wherein the pin 94 is engaged within the slot 93, or to a disengaged position. The manual rotation of the handwheel 91, when in the engaged position, serves to revolve the shaft 87 and thereby the primary drive shaft 83. It is therefore apparent that the primary drive shaft 83 may be power driven by the base motor 22 or may be manually rotated by means of the handwheel 91.

Figures 4, 10:
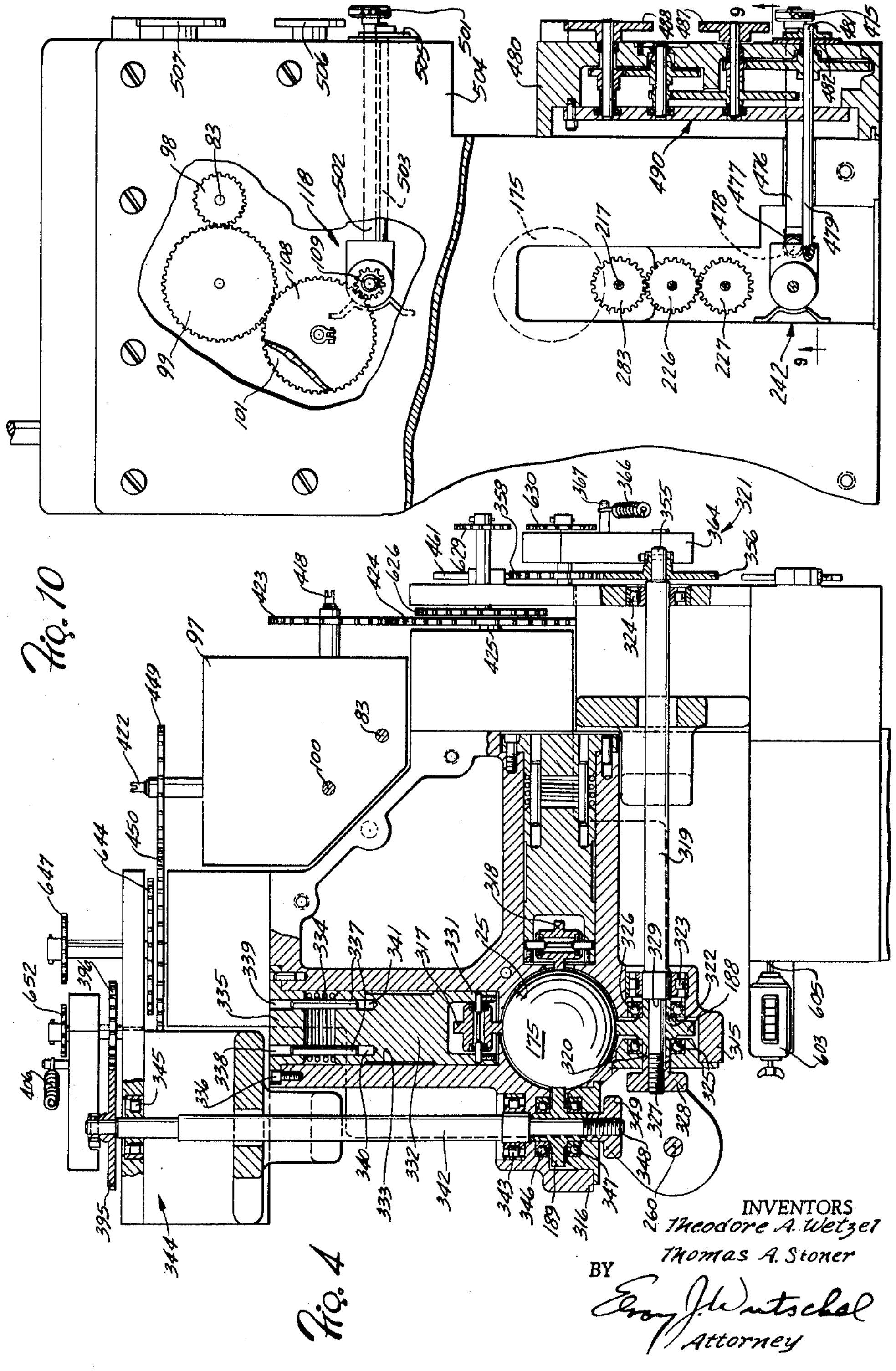
FIG. 4 is a view partly in horizontal section and partly in plan illustrating the sphere of the mechanical resolver with its cooperating power take-off wheels.
FIG. 10 is a view partly in horizontal section and partly in plan taken along the plane represented by the line 10—10 in FIG. 2, depicting the speed changer and rate changer gear box to show the relationship and arrangement of the associated dial transmissions.
Figure 11:
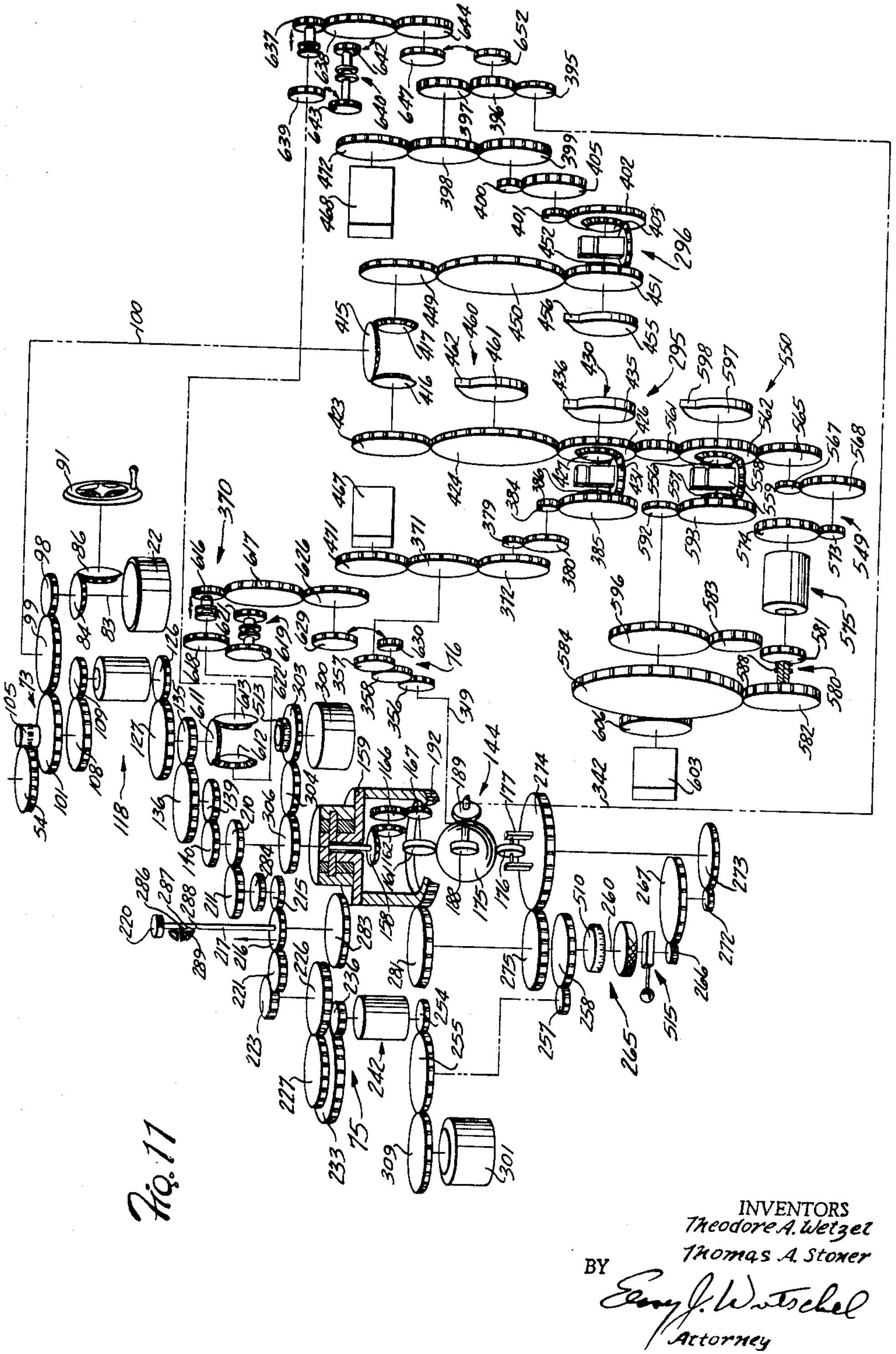
FIG. 11 is a schematic representation showing the relationship and arrangement of the various transmissions connected to drive the mechanical pulsers.

The primary drive shaft 83 extends upwardly through a bearing casting 97 which is disposed adjacent to the castings 23 and 24 and supported on the base casting 21. The primary drive shaft 83 continues upwardly through the transmission casting 27 to terminate in the cap or top casting 28 with its upper end being journalled therein. As shown in FIGS. 10 and 11, the upper end of the primary drive shaft 83 is provided with a gear 98 which is in meshing engagement with a gear 99 mounted on the upper end of a reference drive shaft 100, shown in FIGS. 3 and 10. The primary drive shaft 83 is also connected to drive the capstan spindle 53, as shown in FIGS. 3 and 11, through the gear 99 which has meshing engagement with a gear 101 mounted on a vertical intermediate shaft 102 which is rotatably supported in the castings 27 and 28, being journalled therein by a pair of antifriction bearings 103 and 104. The lower portion of the intermediate shaft 102 is provided with a worm 105 that has meshing engagement with the worm gear 54 which is secured to the inner extending end of the capstan spindle 53 as previously described.

The primary drive shaft 83 is also connected to drive the gear reduction transmission R1. As previously mentioned, the transmission R1 includes the change gear transmission 73 which in the structural embodiment, as shown in FIG. 3, comprises a pair of change gears 108 and 109. The change gear 108 is removably secured to the upwardly extending end of the intermediate shaft 102 and is in meshing engagement with the change gear 109. The change gear 109 is removably secured on a shaft 110 that is journalled in a pair of ball bearings 111 and 112 mounted in the top casting 28. The change gears 108 and 109 are accessibly disposed within a chamber 113 provided in a change gear housing 114 integrally formed with the cap or top casting 28 and they may be replaced by other gears to vary the reduction ratio of the transmission R1 in well known manner. A removable cover plate 115 is provided to seal the chamber 113 and to provide access to the change gears 108 and 109.

The gear reduction transmission R1 also incorporates the infinitely variable speed changer 118 which is disposed within a suitable opening provided in the upper transmission casting 27 and arranged in a manner that a shaft 119 thereof, serving as an input shaft, extends upwardly into a socket 120 formed on the end of the shaft 110. The input shaft 119 of the speed changer 118 is rigidly coupled to the shaft 110 by means of a set screw 121 which is threaded through the wall of the socket 120 to engage the shaft 119 to rigidly couple the two shafts together. An output shaft 122 of the speed changer 118 is displaced 180° from the shaft 119 and extends downwardly into the lower transmission casting 26. The input shaft 119 of the speed changer 118 is connected to drive its output shaft 122 at infinitely variable speed rates in a well known manner. The speed changer 118 includes an adjusting shaft 123 which is connected to effect an adjustment in the variable driving connection between the shafts 119 and 122 and operates, when actuated, to vary the speed change ratio between the input shaft 119 and the output shaft 122 within the limits of the mechanism.

The gear reduction transmission R1 includes fixed gearing 74, shown in FIG. 3, that comprises a gear 126 secured to the end of the output shaft 122 and which is in meshing engagement with a gear 127 that is fixedly secured to a shaft 128. The upper portion 129 of the shaft 128 is journalled in bearings 130 and 131 and the shaft extends downwardly therefrom through a bearing bracket 132 where it is journalled in a pair of antifriction bearings 133 and 134, the bracket 132 being secured to the exterior of the main casting 24. It is therefore apparent that the shaft 128 is rotated at a rate that will vary with a variation in the adjustment of the speed changer 118 as well as with a variation in the ratio of the change gears 73. The rotating shaft 128 serves as a source of power for driving a mechanism to be subsequently described.

The upper portion 129 of the shaft 128 is provided with another gear 135 which is disposed to mesh with a gear 136 mounted on a shaft 137 journalled in the upper and lower transmission castings 27 and 26. The lower end 138 of the shaft 137 has secured to it a gear 139 having engagement with a gear 140. The gears 126, 127, 135, 136, 139 and 140 comprise the fixed gearing 74 referred to in the block diagram of FIG. 8 and which is connected to drive the ball transmission generally indicated in the diagrammatic view of FIG. 8 and in FIGS. 3 and 11 by the reference numeral 144.

The ball transmission 144 is generally similar in construction and identical in operation to the ball transmission described in Patent No. 2,869,429 which issued on January 20, 1959. Its operation may be best understood from the diagrammatic view of FIG. 11 where only the principal parts of the mechanism are shown and are illustrated there schematically. The ball transmission 144 generally comprises a ball or sphere 175 which is supported for rotation about an infinite number of axes and is driven in its rotary movement by a drive wheel 161 which is in frictional driving engagement with the surface of the sphere. The drive wheel 161 is connected to be rotated about its own axis by the motor 22 through the transmission R1 and the rotation of the drive wheel 161 causes a rotation of the sphere 175 by virtue of the frictional engagement that the drive wheel 161 has with the sphere 175.

The rotating sphere 175 transmits power to a pair of power take-off wheels 188 and 189 that are likewise in frictional driving engagement with the sphere, the take-off wheel 188 being located in a plane that is displaced 90° from the plane of the take-off wheel 189. The take-wheel 188 transmits the control information for the "X" axis of the machine tool slide motion while the take-off wheel 189 transmits the control information for the "Y" axis of the slide motion.

In addition to being rotatable about its own axis, the drive wheel 161 is rotatable bodily to change the position of its axis of rotation and thereby change the position of the axis of rotation of the ball 175. An angular change in the position of the axis of rotation of the ball 175 produces a change in the distribution of the input between the two take-off wheels 188 and 189. Thus, it is apparent that when the drive wheel 161 is revolved about its horizontal axis it will cause the ball 175 to revolve, and the axis of rotation of the ball 175 will be parallel to the axis of rotation of the drive wheel 161, this being true regardless of the position of the axis of the drive wheel 161. The power take-off wheels 188 and 189 being in frictional contact with the surface of the ball 175 will be driven with a peripheral speed equal to the surface speed of that part of the ball 175 that they are in contact with. Obviously, an angular change in the orientation of the axis of rotation of the ball 175 will change the peripheral speed of the surface of the ball that the take-off wheels 188 and 189 are in contact with, to change the rate of rotation of the take-off wheels, and this speed of the power take-off wheels will vary as the cosine of the angle that the axis of rotation of the ball 175 makes with the axis of the driven power take-off wheels 188 or 189.

The actual construction of the ball transmission 144 and the drive train for carrying power to the ball transmission 144 are best illustrated in FIG. 3. As previously mentioned, the power for rotating the drive wheel 161 to revolve the sphere 175 is derived from the motor 22 and transmitted to the gear transmission R1 which comprises the change gear transmission 73, the infinitely variable speed changer 118 and the fixed gearing 74. In order to effect the driving connection to rotate the drive wheel 161, the gear 140 of the fixed gearing 74 of the transmission R1 is secured to the upper portion of a planetary gear drive shaft 141 that extends downwardly into a planetary gear chamber 142 provided in the main casting 24. The drive shaft 141 is, in turn, connected to drive a planetary gear system generally denoted by the reference numeral 145.

The planetary gear system 145 is connected to rotate a shaft 157 that extends downwardly from the planetary gear system 145 into a housing 159 and has a bevel gear 158 secured to its lower end. The housing 159 serves to enclose a drive wheel gear train, generally denoted by the numeral 160, which transmits power to the drive wheel 161. The bevel gear 158 is connected to drive the gear train 160 and to this end has meshing engagement with a cooperating bevel gear 162 which is keyed to a stub shaft 163 that is journalled in the housing 159. A spur gear 166 is keyed to the extending hub of the bevel gear 162 and has meshing engagement with another spur gear 167. The spur gear 167 is integrally formed with a shaft 168 which is journalled in the housing 159 by a ball bearing 169 and extends outwardly therefrom into a hub 170 of the drive wheel 161. The shaft 168 is secured within the hub 170 by a pin 171 so that it will revolve in unison with the drive wheel 161. The inner end of the hub 170 is also journalled in the housing 159 by a tapered roller bearing 172 so that the drive wheel 161 is freely rotatable about its axis within the housing 159.

The drive wheen 161, as previously mentioned, operates to rotate the sphere 175 which is retained in position and in frictional driving engagement with the drive wheel 161 by an idler wheel 176. The idler wheel 176 is in contact with the ball 175 at a point diametrically opposite the point of contact with the drive wheel 161 to retain the ball in driving engagement with the drive wheel.

The idler wheel 176 is rotatably mounted in a bracket 177 integrally formed on the upper portion of a shaft 178. The shaft 178 and the bracket 177 are rotatably mounted within a sleeve 179 by a pair of ball bearings 181 and 182 that are supported within the bore 25 of the main casting 24. The shaft 178 extends downwardly into the lower casting 23 and has secured to its lower end a gear cluster 183 which is fixed to the shaft 178 by means of a pin 184. Thus, the entire unit comprising the idler wheel 176, the bracket 177, the shaft 178 and the gear cluster 183, is supported within the bore 25 of the casting 24 for rotation as a unit. Therefore, a rotary movement of the gear cluster 183 will produce a like rotary movement of the idler wheel 176. The drive wheel 161 will rotate in unison with the idler wheel 176 by reason of an interconnection between the gear cluster 183 and the housing 159 which rotatably supports the drive wheel 161. Thus, the gear cluster 183 comprises two spur gears 273 and 274 with the latter being in mesh with a cooperating spur gear 275. The gear 275 is fixedly secured to the lower end of a vertical shaft 276 that extends through a bore 277 formed in the main casting 24 and is journalled in a pair of ball bearings 278 and 279. A spur gear 281 is secured to the upper end of the shaft 276 and is in meshing engagement with a gear 192 formed at the lower end of the housing 159. As a result of this connection, rotation of the gear cluster 183 will cause a corresponding rotation of the housing 159, and the drive wheel 161 will rotate bodily with the housing 159 since it is supported thereby. The idler wheel 176 will likewise rotate bodily in unison with the drive wheel 161 by virtue of the fact that it is carried by the shaft 178 which also carries the gear cluster 183 and the idler wheel will therefore always be maintained in alignment with the drive wheel 161.

Such rotary movement or steering of the drive wheel 161 serves to change the angular position of its axis of rotation and the axis of rotation of the ball 175 varies accordingly to orient itself in a direction parallel to the axis of rotation of the drive wheel 161. The steering of the drive wheel 161 therefore serves to adjust the distribution of the input to the ball 175 between the two take-off wheels 188 and 189 with the distribution remaining in a sine-cosine relationship in which the speed of either of the take-off wheels 188 and 189 will vary as the cosine of the angle that the axis of rotation of the sphere 175 makes with the axis of the power take-off wheel. As previously mentioned, the steering of the drive wheel 161 is accomplished by power through the transmission R*s* and to this end, the latter is drivingly connected to the gear 273 of the gear cluster 183 as will be subsequently described.

It is apparent from the above description that the drive wheel 161 is steered or rotated bodily by effecting a rotational movement of the entire housing 159 and its related parts. Since the bevel gear 162 is rotatably supported by the housing 159, when the latter pivots it moves the bevel gear 162 bodily with it about the bevel gear 158. Such bodily movement of the bevel gear 162 about the bevel gear 158 would normally affect the speed of rotation of the drive wheel 161, causing either a decrease or increase in its speed, depending on the direction in which the bevel gear 162 is moved. Such variation in the speed of the drive wheel 161 would adversely affect the accuracy of the input to the "X" and "Y" differential mechanisms. Therefore, the bodily movement of the bevel gear 162 about its cooperating bevel gear 158 is compensated for by the operation of a planetary gear system 154 which is connected to the planetary gear system 145.

The planetary gear system 154 functions in response to the rotary movement of the housing 159 by reason of the action of a sun gear 194 which is mounted on an upwardly extending end of the housing 159 to be located in position to form a part of the planetary gear system 154. Therefore, the sun gear 194 will rotate with the housing 159 to actuate the planetary gear system 154 when the drive wheel 161 is steered to adjust the distribution of the output of the ball transmission 144. The planetary gear system 154, in turn, is connected by a double flange collar 151 to the planetary gear system 145 which transmits the drive for rotating the drive wheel 161 about its own axis. As a result, the actuation of the planetary gear system 154 by rotation of the sun gear 194 affects the planetary gear system 145 to compensate for the bodily movement of the bevel gear 162 about the bevel gear 158 by either decreasing or increasing the rotation of the shaft 157, depending upon the direction in which the rotation of the drive wheel 161 and its associated housing 159 occurs.

Thus, if the steering of the drive wheel 161 causes bodily movement of the bevel gear 162 about the bevel gear 158 to produce a decrease in the speed of the drive wheel 161, the rotational movement of the housing 159 would cause an increase in the speed of the bevel gear 158 through the planetary gear systems 145 and 154 as described, so that the rate of rotation of the drive wheel 161 will remain substantially constant. In like manner, if steering of the drive wheel 161 causes the bevel gear 162 to be moved bodily about the bevel gear 158 in a direction to produce an increase in the speed of the driving wheel 161, the planetary gear systems 145 and 154 will act to decrease the speed of the bevel gear 158 a sufficient amount to compensate the bodily movement of the bevel gear 162, and thereby preserve the uniformity of the rotation of the drive wheel 161. A more detailed description of the construction and operation of this compensating mechanism in the gear train to the drive wheel 161 is contained in the previously mentioned Patent No. 2,869,429.

As stated the steering of the drive wheel 161 is accomplished by means of the steering transmission R*s* which is indicated diagrammatically in FIG. 8. An exemplary embodiment of the steering transmission R*s* is shown in FIGS. 3 and 11 and as there shown, it comprises a gear 210 keyed or otherwise secured to the drive shaft 141 for rotation with it for taking power from the shaft 141 for effecting the steering of the drive wheel 161. The steering transmission is therefore driven by the shaft 141 which also is connected to drive the planetary gear system for rotating the drive wheel 161 about its own axis to constitute the input to the ball transmission 144.

The gear 210 is in meshing engagement with a power transmitting gear 211 fixed to a power transmitting shaft 212 rotatably journalled in a pair of bearings 213 and 214 mounted in the upper and lower transmission castings 27 and 26, respectively. A gear 215 fixedly secured to the power transmitting shaft 212 is in meshing engagement with a gear 216 secured to a rotatable shifter shaft 217. The shifter shaft 217 extends upwardly through a bore 218 to protrude through a boss 219 integrally formed on the cap or top casting 28. The shifter shaft 217 is provided with a knob 220 by which the shifter shaft may be manually actuated axially to a selected one of three positions. The gear 216 is disposed in meshing engagement with an idler gear 221 fixed to an idler shaft 222 journalled in the lower transmission casting 26. The idler gear 221 has meshing engagement with another idler gear 223 fixedly secured to a shaft 224 journalled in the upper and lower transmission castings 27 and 26. The shaft 224 operates to rotate a gear 226 fixed to the shaft 224 for rotation with it. The gear 226 is disposed in meshing engagement with a gear 227 fixedly secured to a shaft 228 which extends upwardly into a change gear chamber 229 formed in the boss 219, being journalled in the upper transmission casting 27 in a bearing 230 and a pair of ball bearings 231 and 232. The chamber 229 contains the change gearing 75 which comprises a change gear 233 removably secured to the extending end of the shaft 228 and is disposed in meshing engagement with a change gear 236 removably secured to the extending end of an extension shaft 237 extending downwardly from the change gear chamber 229 into the cap or top casting 28, being journalled therein by a pair of ball bearings 238 and 239.

An infinitely variable speed changer, generally indicated by the reference numeral 242, is disposed within a bore 243 provided in the upper transmission casting 27 and arranged in a manner so that its input shaft 244 extends upwardly into a socket 245 formed at the lower extremity of the extension shaft 237 and is rigidly coupled thereto by means of a set screw 246. An output shaft 247 of the speed changer 242 extends downwardly into the lower transmission casting 26 into a socket 248 which is formed on the upper end of an extension shaft 249 that is journalled in a bearing 251 mounted in the main casting 24. The output shaft 247 and the extension shaft 249 are rigidly coupled together by means of a set screw 252 which is threaded into the socket 248 to engage the periphery of the output shaft 247. The infinitely variable speed changer 242 is an exact duplicate of the speed changer 118 and operates in the same manner. An adjusting shaft 253 is provided for the speed changer 242 and operates when actuated to vary the speed change ratio of the speed changer 242 within the limits of the mechanism.

Figure 5:
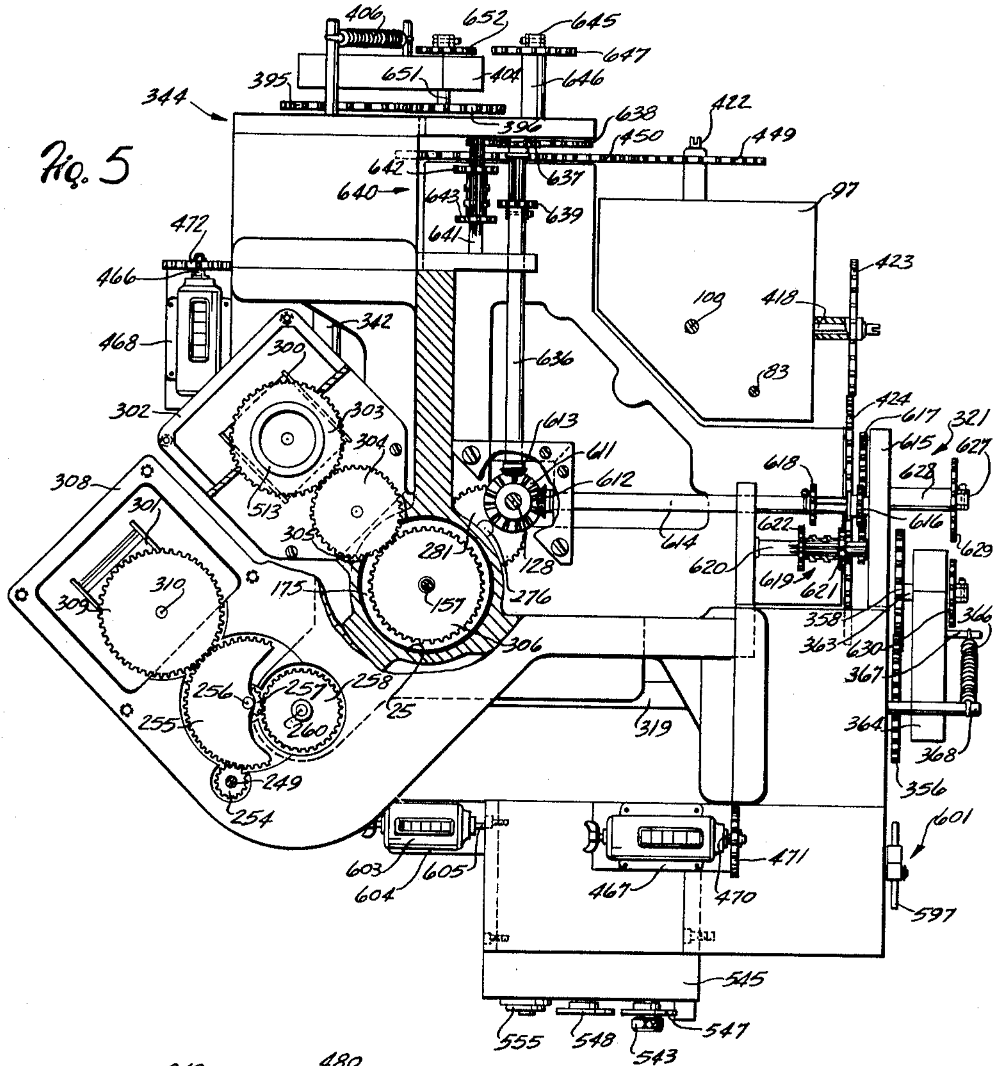
FIG. 5 is a view partly in vertical section and partly in plan taken through the apparatus to illustrate the steering transmission and the drive wheel transmission torque motors showing them operatively connected to their respective transmissions and to show a portion of the transmission for the sine-cosine mechanism.

The drive from the speed changer 242 is transmitted from the shaft extension 249 to a pinion gear 254 mounted on the lower end of the shaft extension 249 for rotation therewith. As shown in FIGS. 5 and 11, the pinion gear 254 is in meshing engagement with an intermediate transmission gear 255 fixedly secured to a vertically disposed stub shaft 256 journalled in the lower transmission casting 26 and the main casting 24. The stub shaft 256 has secured to its lower end a pinion gear 257 which is disposed to mesh with a gear 258, as shown in FIGS. 3 and 5. The gear 258 is mounted on the upper end of a steering adjusting shaft 260 which extends downwardly into the base casting 21, being journalled in bearings 261, 262 and 263. The adjusting shaft 260 is connected to drive a fixed gear transmission, generally indicated by the reference numeral 265, its lower end being provided with a pinion gear 266 that is secured to it for rotation with it. The pinion gear 266 is disposed in meshing engagement with a gear 267 integrally formed on a pinion shaft 268, journalled in a pair of antifriction bearings 269 and 271. The upper end of the pinion shaft 268 has an integrally formed pinion 272 which operates to drive the gear cluster 183 fixedly secured on the end of the ball loading wheel shaft 178. The gear cluster 183 includes the gear 273 in mesh with the pinion 272 and the pinion 274 drivingly engaged with the spur gear 275. The drive for steering the drive wheel 161 is then completed as previously described through the shaft 276, the gear 281 and the gear 192 which is mounted on the lower end of the housing 159.

In order to steer the drive wheel 161 in a reverse or counterclockwise direction a reversing drive is provided. To this end, the shifter shaft 217 is provided with a fixed gear 283 that is secured thereto for rotation and axial movement with the shaft. Upon movement of the shifter shaft 217 to its uppermost position the gear 283 will be moved upwardly into meshing engagement with the gear 226, while the gear 216 is moved upwardly out of engagement with the gears 215 and 221, to disconnect the forward or clockwise steering drive from the drive shaft 141 to the drive wheel 161. As the gear 216 is moved out of engagement with the gears 215 and 221, upon movement of the shifter shaft 217 to its uppermost position, the gear 216 will be moved into engagement with a driving gear 284 fixedly secured to the intermediate shaft 212. Thus, a drive in a reverse direction will be established from the drive shaft 141 and the gear 210, to the gear 211 on the intermediate shaft 212 and through the shaft 212 to the gear 284. From the gear 284 the drive will continue through the gear 216 and the shifter shaft 217 to the gear 283 and thence to the gear 226 and be transmitted through the balance of the transmission previously described, to effect counterclockwise steering of the drive wheel 161.

In order to establish the proper location of the shifter shaft 217 for any one of its three positions, namely, reverse or counterclockwise steering, neutral or no steering, and forward or clockwise steering, the upper portion 285 of the shifter shaft 217 is provided with three annular notches or grooves 286, 287 and 288. The notches or grooves 286, 287 and 288 are adapted to receive a detent ball 289 which is mounted in a horizontally disposed bore 291, provided in the extending boss 219 through which the shifter shaft 217 extends. The detent ball 289 is resiliently urged inwardly towards the shifter shaft 217 by means of a spring 292 retained within the bore 291 by means of a set screw 293. Thus, with the shifter shaft 217 positioned as shown in FIG. 3, the annular groove 286 is in position to receive the detent ball 289 which operates to maintain the shaft 217 in position. When the shifter shaft 217 is in its lowermost position, wherein the annular groove 286 is in position to receive the detent ball 289, it engages the transmission so as to effect clockwise steering of the drive wheel 161. In this position the gear 283 is disengaged from the gear 226 and the gear 216 is disengaged from the drive gear 284 but is positioned to engage the clockwise drive gear 215.

To effect counterclockwise steering of the drive wheel 161, the shifter shaft 217 is moved upwardly, by means of the knob 220, so as to align the annular groove 288 in position to receive the detent ball 289. In this position the gear 283 will be moved into meshing engagement with gear 226, and the gear 216 will be disengaged from the idler gear 221 and the clockwise drive gear 215 and engaged with the counterclockwise drive gear 284. If it is desired to maintain the axis of the drive wheel 161 in a fixed or stationary position, the shifter shaft 217 may be moved to an intermediate position wherein the annular groove 287 is positioned to receive the detent ball 289. In this position the gear 283 will move upwardly, as viewed in FIG. 3, with the shifter shaft 217, but will not be engaged with the gear 226. Simultaneously, the gear 216 will be moved out of engagement with the idler gear 221 and the clockwise drive gear 215 into an intermediate position between the counterclockwise drive gear 234 and the clockwise drive gear 215. Thus, the drive from the drive shaft 141 to the steering gear 192 is interrupted and the axis of the drive wheel 161 will be maintained stationary.

In order to eliminate lost motion in the gear train for transmitting the torque to steer the drive wheel 161 a pair of torque motors 300 and 301 are connected in the gear train to act in opposition to each other, as shown in FIGS. 5 and 11, for removing backlash from the gear train. To this end, the torque motor 300 is supported within a housing 302 integrally formed with the main casting 24, being connected to drive a gear 303. The gear 303 is disposed in meshing engagement with an idler gear 304 which is arranged so as to extend into the bore 25 of the main casting 24 through a suitable opening 305, into meshing engagement with a gear 306. The gear 306 is mounted about the upper end of the housing 159, as shown in FIG. 3, and is supported in position on an annular flange 307 integrally formed on the housing 159, being secured thereto by means of a dowel (not shown) in a well known manner. The torque motor 301, acts to apply a yieldable force in the transmission in a direction opposite to the direction in which the torque motor 300 acts and is mounted in a housing 308, being connected to drive a gear 309 rotatably supported on a shaft 310 journalled in the housing 308. The gear 309 is in meshing engagement with the gear 255 to thereby preload the transmission which transmits the drive to the steering gear 192 as previously described. Thus, the housing 159, in which the driving wheel 161 is rotatably supported is urged in one direction by the torque motor 300 to produce a yieldable force in the transmission while the torque motor 301 is producing a similar force in the same transmission but acting in the opposite direction. As a result, the torque motors 300 and 301 operate to eliminate lost motion regardless of the direction of steering so that the driving wheel 161 and its loading wheel 176 will respond instantaneously to effect a desired distribution of the output of the resolver 144.

Power steering of the drive wheel 161 through the transmission E*s* is provided for recording information which will control the machine tool slides to produce a curvilinear configuration in the workpiece. Under these circumstances it is necessary to continuously steer the drive wheel 161 while it is rotating about its own axis so that on playback, the rate of travel of one of the machine tool slides will be accelerating at a predetermined rate while the other slide will be decelerating to produce the curvilinear configuration. The radius of such curvature, of course, will vary with the rate at which the drive wheel 161 is steered, with the radius decreasing as the rate of steering is increased and vice versa.

Figure 9:
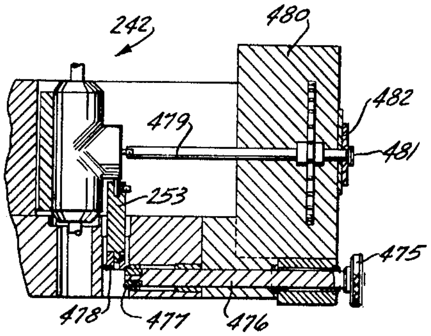
FIG. 9 is an enlarged view partly in vertical section and partly in elevation taken along the plane represented by the line 9—9 in FIG. 10 to show the steering rate changer for establishing a radius.

For this reason, the speed changer 242 is incorporated in the transmission R*s* to provide a convenient means of adjusting the rate of the steering action for obtaining the desired radius of curvature. Since the speed changer 242 is a part of the transmission R*s*, an adjustment of the speed ratio of the speed changer 242 will vary the ratio of the transmission R*s* to either increase or decrease the rate of steering of the drive wheel 161 to establish the desired radius of curvature. To effect an adjustment of the speed changer 242 an adjusting knob 475, shown in FIGS. 2, 9 and 10, is provided and is secured to the outwardly extending end of a horizontally disposed actuating shaft 476 rotatably supported in the upper transmission casting 27. The inner end of the shaft 476 is provided with a bevel gear 477 which is in meshing engagement with a bevel gear 478 provided on the end of the speed changer adjusting shaft 253.

Rotation of the knob 475 will operate to effect an adjustment of the speed changer 242, which, in turn, will operate to rotate a shaft 479 operably connected therein. The shaft 479 extends outwardly from the speed changer 242 through the upper transmission casting 27 and extends through an indicator gear box 480 secured to the side of the casting 27. The outwardly extending end 481 of the shaft 479 is provided with a dial 482 having a series of unit indicia readable against an indicator mark (not shown). The unit indicia on the dial 482 indicate the rate of steering established by the operation of the knob 475. Since the indicia on the dial 482 are in full units and the speed changer 242 is infinitely variable within its limits, other indicia bearing dials 487 and 488 with appropriate reduction gearing 490 are provided to enable the speed changer to be adjusted to a desired thousandth of a unit.

Since the setting of the dials indicate only a particular setting of the speed changer 252, a chart (not shown) is provided on which a comparable radius in inches is given for the dial settings. Thus, if it is desired to record on the magnetic tape a path of travel about a radius of five inches it is only necessary to refer to the chart (not shown) and note the dial settings given for a five inch radius. The knob 475 will then be turned in one direction or the other, as the case may be, until the dials indicate the setting indicated by the chart. In this manner proper steering of the drive wheel 161 will be accomplished so that proper distribution of take-off speeds will be effected to vary the motion input from the sphere 175 to the "X" and "Y" take-off wheels 188 and 189 in a sine-cosine relationship.

As previously mentioned the output of the sine-cosine resolver 144 is along "X" and "Y" axes which feed separate "X" and "Y" differential mechanisms generally indicated by the reference numerals 295 and 296 respectively, as shown diagrammatically in FIG. 11. The output from the resolver 144 is transmitted to the separate "X" and "Y" differentials 295 and 296 through separate transmissions, the transmission to the "X" differential being represented in the diagrammatic view of FIG. 8 by the block R*o*. To this end, as shown in FIGS. 1 and 4, the "X" and "Y" power take-off wheels 188 and 189, respectively, are rotatably supported within housings 315 and 316 in frictional engagement with the sphere 175 with their axes of rotation in the same horizontal plane but disposed 90° apart relative to each other. The frictional driving engagement of the take-off wheels 188 and 189 with the sphere 175 is maintained through a pair of reaction or loading wheels 317 and 318, respectively. The loading wheels 317 and 318 are in contact with the sphere 175 at points diametrically opposite the point of contact with their respective take-off wheels, to maintain the sphere in driving engagement with the take-off wheels. Since each of the take-off wheels 188 and 189, their associated loading wheels, and associated drive mechanism are exactly the same, a detailed description of the "X" power take-off wheel 188 only will be given, and the description thereof will apply to the "Y" power take-off wheel 189 and its associated mechanism.

As shown in FIGS. 4 and 6, the "X" power take-off wheel 188 is rotatably mounted on an "X" power take-off shaft 319 which extends outwardly of the housing 315 into an "X" differential support, generally identified by the reference numeral 321, being journalled in a pair of axially adjustable antifriction bearings 323 and 324. The power take-off wheel 188 is provided with extending hubs 320 and 322 which are journalled in a pair of radial antifriction bearings 325 and 326, carried in the housing 315. Thus, the shaft 319 floats within its bearings 323 and 324 and is freely rotatable relative to the wheel 188, while the wheel 188 is freely rotatable relative to the shaft 319 but is maintained axially stationary. To effect a clutching of the shaft 319 to the wheel 188 in order to effect a drive therebetween, the end of the shaft 319, in the housing 315, is provided with a threaded end 327 which threadedly receives a knurled nut 328. When the nut 328 is threaded onto the shaft 319 and into engagement with the axial face of the hub 320 it will effect axial movement of the shaft 319 leftwardly, as viewed in FIGS. 4 and 6. Since the wheel 188 cannot move axially, movement of the shaft to the left will operate to positively engage a shoulder 329 on the shaft 319 with the axial face of the hub 322 of the wheel 188 to effect a driving engagement of the wheel 188 with the shaft 319.

The loading wheel 317, associated with the power take-off wheel 188 is rotatably supported in a bracket 331 formed on the inner end of a carrier 332. The carrier 332 is supported within a horizontal bore 333 provided in the main casting 24 and is urged inwardly to effect engagement of the loading wheel 317 with the surface of the sphere 175. To positively engage the sphere 175 with the power take-off wheel 188 the loading wheel 317 is firmly engaged with the sphere 175 by means of a compression spring 334. The spring 334 is mounted within the bore 333 and positioned so as to engage the outer end of the carrier 332. A retainer cap 335 is inserted within the bore 333 into engagement with the end of the spring 334 and is secured in position by means of screws 336. The retainer cap 335 operates to compress the spring 334 to effect a desired loading of the wheel 317 against the surface of the sphere 175 and thereby effect the desired frictional engagement of the sphere 175 with the power take-off wheel 188.

To effect an exact alignment of the loading wheel 317 relative to its associated power take-off wheel 188 and to prevent the carrier 332 and thereby the loading wheel 317 from rotating within the bore 333 whenever the rotational axis of the sphere 175 is varied, the carrier 332 is connected to the fixed retainer cap 335. To this end, a pair of dowels 337 are inserted through suitable openings 338 and 339 provided in the retainer cap 335, and are received in openings 340 and 341 provided in the carrier 332. Thus, the carrier 332 and thereby the loading wheel 317 are axially movable within the bore 333 to effect the desired frictional engagement of the wheel 317 with the sphere and thereby maintain the proper frictional engagement of the sphere 175 with the take-off wheel 188. However, the loading wheel 317 will be maintained in alignment with the power take-off wheel 188 by operation of the dowels 337 connected to the retainer cap 335 which is screw fastened in on oriented position to the main casting 24.

Similarly, the "Y" power take-off wheel 189 is rotatably mounted on a "Y" drive shaft 342 one end of which extends within the housing 316 being journalled therein in an axially adjustable bearing 343. The opposite end of the shaft 342 extends through a "Y" differential support, generally indicated by the reference numeral 344, being rotatably supported therein by an axially adjustable bearing 345. The "Y" power take-off wheel 189 is similar to the take-off wheel 188, being journalled in a pair of antifriction bearings 346 and 347. Thus, the power take-off wheel 189 is freely rotatable on the shaft 342 while the shaft 342 is rotatable in its bearings 343 and 345. The shaft 342 is provided with a threaded end 348 which receives a clutching nut 349 that operates to engage the shaft 342 with the power take-off wheel 189, as described in conjunction with the wheel 188 and shaft 319.

The shafts 319 and 342 are each connected to drive a respective transmission, one of which is indicated in the block diagram of FIG. 8 as R*o*. The transmission R*o* comprises a change gear generally identified by the reference numeral 356, and fixed gearing generally identified by the reference numeral 76, as indicated diagrammatically in FIG. 8. Each of these transmissions are connected to one side of respective "X" and "Y' 'differential mechanisms.

Figures 7, 12:
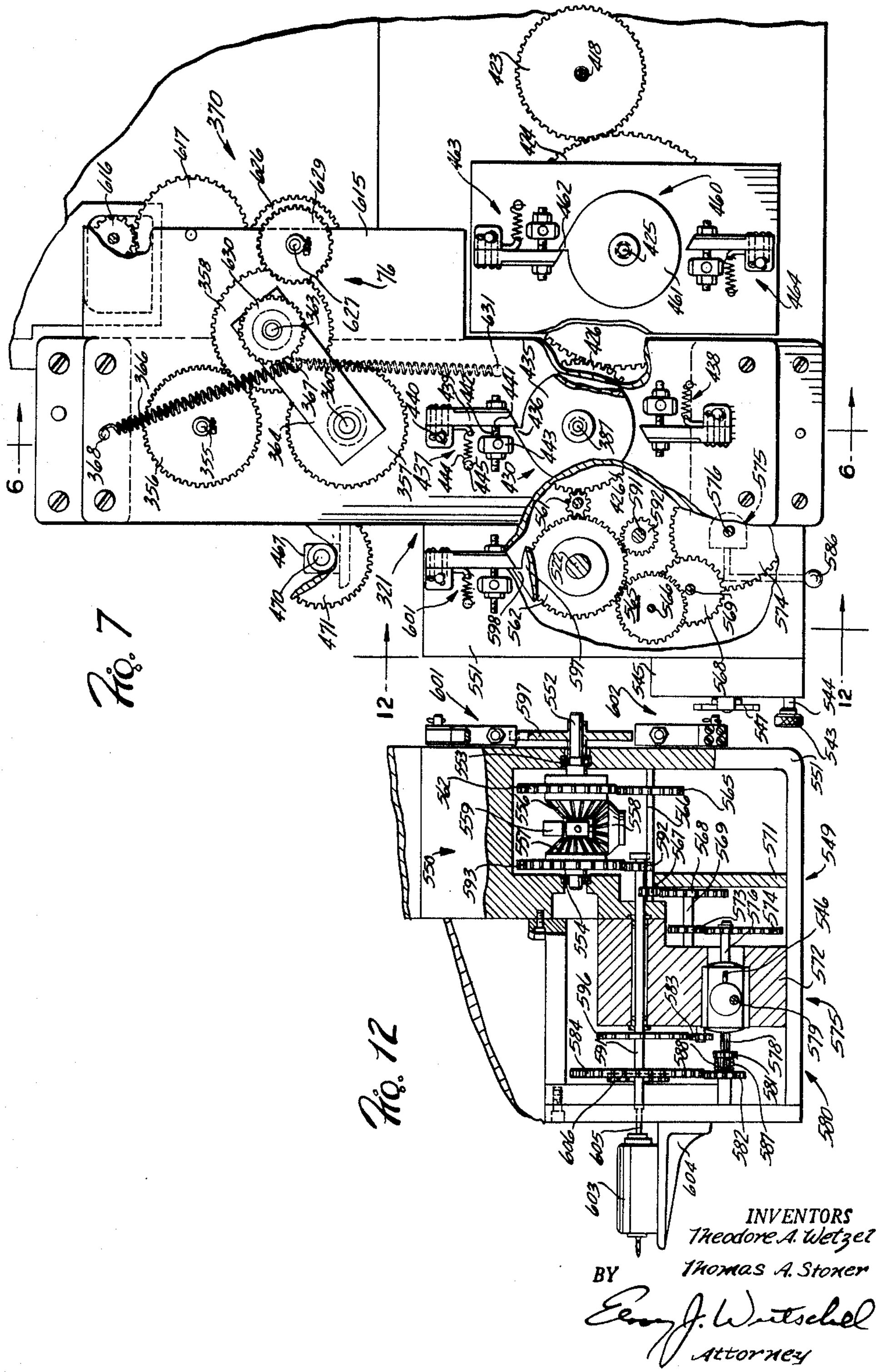
FIG. 7 is a fragmentary view mostly in right side elevation illustrating the mechanical pulsers for the "X" reference, and "Z" axes with parts of the front wall of the differential support being broken away to show the internal gearing arrangement.
FIG. 12 is a view partly in elevation and partly in section taken along the plane represented by the line 12—12 in FIG. 7 to illustrate the "Z" axis mechanism.

As shown in FIGS. 4, 6 and 7 and diagrammatically in FIG. 11, the shaft 319 extends through the "X" differential support 321 with the extending end 355 thereof having the change gear 356 mounted thereon for rotation with it. The change gear 356 is adapted to drive a fixed gear 357 through a positionable or clutching gear 358. The gear 357 is pinned to the extending end 359 of a shaft 360, journalled in a pair of antifriction bearings 361 and 362 supported in the differential support 321. The clutching gear 358 is also employed to transmit a drive from a sine-cosine transmission to be described and generally indicated by the reference numeral 370, to the "X" differential mechanism 295. When so employed, the clutching gear 358 must be disconnected from the change gear 356 to interrupt the "X" output drive from the sphere 175 to the differential 295. In either condition of operation the clutching gear 358 must be positively retained in meshing engagement with the fixed gear 357. Therefore, as best shown in FIG. 7, the clutching gear 358 is affixed to a rotatable shaft 363 journalled in one end of a pivotal arm 364. The arm 364 is pivotally secured at its opposite end to the extending end 359 of the shaft 360 being secured thereon by a snap ring 365. To maintain the clutching gear 358 in meshing engagement with the fixed gear 356 to thereby effect a drive to the gear 357 a spring 366 is provided. The spring 366 is connected to the extending end of a stud 367 carried by the pivotable arm 364 with its opposite end being connected to a stud 368 carried by the outer wall of the differential support 321 in position above the fixed gead 356. Thus, the force exerted by the spring 366 maintains the clutching gear 358 in meshing engagement with the change gear 356 to thereby effect a drive from the gear 356 through the clutching gear 358 to the fixed gear 357.

The gear 357 effects a reduction drive to one side of the "X" differential mechanism 295 through a fixed gear transmission carried in the differential support 321. To this end, as shown in FIGS. 6 and 11, the inner end of the shaft 360 is provided with a gear 371 which is secured thereto for rotation with the shaft. The gear 371 is in meshing engagement with a gear 372 integrally formed on a shaft 373 which is rotatably supported by a pair of antifriction bearings 374 and 375 mounted in a wall 376 of the differential support 321 and a bearing support plate 377, respectively. The bearing support plate 377 is secured to the wall 376 by cap screws 378. A pinion 379 integrally formed with the shaft 373 is in meshing engagement with a gear 380 integrally formed with a shaft 381 which is journalled in a pair of antifriction bearings 382 and 383 carried in the plate 377 and the wall 376, respectively. A pinion 384 integrally formed on the shaft 381 is in meshing engagement with a driving gear 385 mounted on and secured to the hub of an input bevel gear 386 of the "X" differential mechanism 295. The driving gear 385 operates to drive the bevel gear 386 which is mounted for free rotation on a pulser drive shaft 387 journalled in a pair of antifriction bearings 388 and 389 carried in suitable openings in the walls of the differential support 321. Thus, the output of the sphere 175 along the "X" axis is transmitted to the "X" differential mechanism 295 through the change gear 356, the fixed gearing 358, 357, 371, 372, 379, 380, 384, and 385 and the differential input bevel gear 386 to the pulser shaft 387 with a reduction of 25 to 1 being effected.

Similarly, the output of the sphere 175 along the "Y" axis is transmitted to the "Y" differential mechanism 296 from the take-off wheel 189, as shown diagrammatically in FIG. 11, through an identical reduction transmission comprising a change gear 395, a clutching gear 396 and fixed gearing 397, 398, 399, 400, 405, 401 and 402 which is connected to drive an input bevel gear 403 of the "Y" differential mechanism 296. The "Y" reduction transmission is identical in construction to the "X" reduction transmission, previously described in detail, with the clutch gear 396 being rotatably supported at the end of a pivotal arm 404, as shown in FIG. 1, and held in meshing engagement with the gear 395 by a spring 406 operating as does the spring 366.

From the diagrammatic illustration in FIG. 11 it can be readily observed how the steering of the drive wheel 161 effects the distribution of the power between the "X" and "Y" power take-off wheels 188 and 189, respectively. With the drive wheel 161 in the position shown in FIG. 11, the axis of rotation of the sphere 175 is parallel to the axis of rotation of the "X" power take-off wheel 188, and 90° to the axis of rotation of the "Y" power take-off wheel 189. In this position the "X" take-off wheel 188 is contacting the sphere 175 at a point of maximum surface speed of the sphere 175, while the "Y" power take-off wheel 189 is contacting the sphere at a point of no surface speed. With the elements in this position, the take-off wheel 188 is being driven at maximum speed, and the take-off wheel 189 is stationary. Therefore, the input bevel gear 386 of the "X" differential mechanism 295 is being rotated at a maximum rate, while the input bevel gear 403 of the "Y" differential mechanism 296 is maintained stationary.

If the drive wheel 161 were steered to a position 90° from the position shown, it would be located in the same plane as the "Y" power take-off wheel 189. In this position, the take-off wheel 189 would be driven at maximum speed, while the "X" power take-off wheel 188 would be stationary. The bevel gear 403 of the "Y" differential mechanism 296 would then be driven at maximum rate, while the bevel gear 386 of the "X" differential mechanism 295 would be maintained stationary.

On the other hand, if the drive wheel 161 were steered to a position 45° from the position shown in FIG. 11, it would be at an angle midway between the planes of the power take-off wheels 188 and 189. In this position the surface speed of the sphere 175 at the points of contact with the power take-off wheels 188 and 189 would be equal and both take-off wheels would be driven at the same rate. Under this condition, the input bevel gears 386 and 403 of the respective differential mechanisms 295 and 296 would be rotating at equal speeds and the input to both differential mechanisms from the sine-cosine resolver would be the same.

Thus, it can be seen that as the axis of rotation of the sphere 175 is changed by steering the drive wheel 161, the distribution of the take-off speed from the sphere 175 to the "X" and "Y" power take-off wheels 188 and 189 is changed accordingly, to vary the motion input from the sphere to the respective "X" and "Y" differential mechanisms 295 and 296, respectively. The input to the "X" and "Y" differential mechanisms 295 and 296 always remains in a sine-cosine relationship regardless of the direction in which the drive wheel 161 is steered.

Therefore, as the drive wheel 161 is steered, the rate of rotation of one of the components of the ball transmission 144 will be increased while the other will be decreased in a sine-cosine relationship. The pulses produced by the rotation of these two components will, of course, vary in frequency accordingly. In view of the sine-cosine relationship between these two components they may be adjusted by steering the drive wheel 161 to produce pulses for recording on the "X" and "Y" channels of the magnetic tape at frequencies which, on playback, will cause the two machine tool slides to travel along the "X" and "Y" axes at rates to produce any desired resultant movement between the "X" and "Y" axes.

Thus, with reference to the above mentioned examples of the angular positions of the drive wheel 161, if the latter is steered to the position shown in FIG. 11, the "X" take-off wheel 188 is driven at maximum speed in a positive direction and the "Y" take-off wheel 189 is stationary. This produces pulses at maximum frequency for recording on the "X" channel of the tape to produce a maximum rate of travel of the machine tool slide along the "X" axis on playback while the pulses on the "Y" channel call for the machine tool slide along the "Y" axis to remain at rest. The motion is therefore parallel with the "X" axis in a positive direction.

If the drive wheel 161 were steered in a counterclockwise direction as viewed from the top to a position 90° from the position shown in FIG. 11, it would be located in the same plane as the "Y" power take-off wheel 189 to rotate the latter at a maximum rate in a positive direction and the "X" take-off wheel 188 would be stationary. This produces pulses at maximum frequency for recording on the "Y" channel of the tape to produce a maximum rate of travel of the machine tool slide along the "Y" axis on playback, while the pulses on the "X" channel call for the machine tool slide along the "X" axis to remain at rest. The motion would therefore be parallel to the "Y" axis in a positive direction.

On the other hand, if the drive wheel 161 were steered in a counterclockwise direction as viewed from the top to a position 45° from the position shown in FIG. 11, as previously mentioned, both take-off wheels would be driven at the same rate in a positive direction. The pulses would then be recorded on both the "X" and "Y" channels of the magnetic tape at the same frequency but at a greater frequency than the reference frequency to indicate the positive direction. On playback, the pulses on the "X" and "Y" channels of the magnetic tape would cause movement of the two machine tool slides along the "X" and "Y" axes at the same rate of travel to produce a resultant movement at 45° to the "X" and "Y" axes in a positive direction. It is therefore apparent, that by steering the drive wheel 161 the frequencis of the pulses on the "X" and "Y" channels may be infinitely varied without deviating from the sine-cosine relationship to cause the two machine tool slides to move along the "X" and "Y" axes respectively at varied rates of travel in a sine-cosine relationship with respect to each other to produce any desired resultant movement.

If the drive wheel 161 were steered 135° from the position shown in FIG. 11, in a counterclockwise direction as viewed from the top, the "Y" take-off wheel 189 would continue to be rotated in a positive direction but the direction of the "X" take-off wheel 188 would be reversed to rotate it in a negative direction. Therefore, the resultant motion of the machine tool slides, on playback of the record, would be displaced 90° from the position of the resultant movement produced when the drive wheel 161 was located 45° in a counterclockwise direction from the position shown in FIG. 11.

As previously mentioned, the output of the sine-cosine resolver to the "X" and "Y" differential mechanisms 295 and 296 is related to a reference output which is obtained from the common motor 22 connected through separate but identical gear transmissions to an opposite input bevel gear of the respective "X" and "Y" differential mechanisms 295 and 296. The reference drives to the differential mechanisms 295 and 296 are taken from the reference drive shaft 100, which as previously described is driven by the motor 22 at a constant rate by reason of its driving connection to the primary drive shaft 83 through the gears 98 and 99. As shown in FIGS. 3, 5, 7 and 10, and diagrammatically in FIG. 11, the reference drive shaft 100 extends downwardly from the top casting 28 and is connected by a coupling 411 to the outwardly extending end of a bevel gear shaft 412 which is journalled in the bearing casting 97 by a pair of antifriction bearings 413 and 414. A bevel gear 415 integrally formed on the lower end of the shaft 412 is disposed in meshing engagement with a pair of bevel gears 416 and 417. The bevel gear 416 is integrally formed on the end of a shaft 418 which is journalled in the bearing casting 97 by a pair of antifriction bearings 419 and 421. The bevel gear 417 is likewise, integrally formed on the end of a shaft 422, shown in FIGS. 3, 4 and 5, which is also journalled in the bearing casting 97, but is disposed 90° from the shaft 418. The shafts 418 and 422 transmit the drive from the reference drive shaft 100 to separate gear transmissions which operate to effect a reference input to the "X" and "Y" differential mechanisms 295 and 296, as previously mentioned.

To effect a reference input to the "X" differential mechanism 295, the shaft 418 has secured to its outwardly extending end a gear 423 which has meshing engagement with a gear 424. The gear 424 is secured to a shaft 425 journalled in the differential support 321 and is disposed in driving engagement with a gear 426, shown in FIGS. 6 and 7 and diagrammatically in FIG. 11, that is secured to the hub of a differential input bevel gear 427, as shown in FIG. 6, and which is of the same size and with the same number of teeth as the bevel gear 386, both of which are a part of the differential mechanism 295. The differential input bevel gear is mounted for free rotation on the pulser drive shaft 387. Thus, the "X" differential mechanism 295 receives the output of the sphere 175 from the "X" take-off wheel 188 which operates to drive the input bevel gear 386, and also receives the output of the reference drive through the input bevel gear 427.

These outputs are then summed by the differential mechanism 295 into a resulting output which is transmitted to an "X" mechanical pulser mechanism, generally indicated by the reference numeral 430. To this end, a bevel gear 431 is disposed in meshing engagement with both input bevel gears 386 and 427 and is rotatably mounted on a stub shaft 432 which is fixedly supported in a carrier 433. The carrier 433 is mounted on the pulser shaft 387 and secured thereto by means of a set screw 434 so as to effect rotation of the pulser shaft. Since the input bevel gears 386 and 427 are freely rotatable relative to the pulser shaft 387, they will operate to drive the bevel gear 431 bodily in an orbital path of movement. With the bevel gear 431 being supported by the carrier 433 which is secured to the pulser shaft 387, bodily orbital movement of the bevel gear 431 will operate to drive the pulser shaft at a rate which is one-half the algebraic sum of the rate of rotation of the two separate motions of the bevel gears 386 and 427. The gear ratios of the drives to the differential mechanism 295 are arranged to accommodate the differential mechanism 295 so that its output will drive the "X" pulser mechanism 430 at a rate which is related to the rate of operation of the reference pulser mechanism 460 in such a manner that the pulses produced by the two pulser mechanisms may be compared on playback of the record for regulating the operation of the "X" machine tool slide.

The output of the pulser shaft 387 is employed to mechanically operate the pulser mechanism 430 for actuating the electronic flip-flop circuit 78 as previously described in connection with FIG. 8 to change the state of the flip-flop for producing the pulses which are recorded on the magnetic tape. The electronic flip-flop is electrically connected to a section or channel of the recording head 44 which operates, upon the change in the state of the flip-flop, to impress a change of polarity upon the magnetic tape passing over it so that alternate south and north poles are impressed upon the magnetic tape by operation of the flip-flop circuit with each change in polarity constituting one of the pulses previously referred to, the frequency of the pulses depending upon the rate of the output of the differential mechanism. The pulser mechanism 430 is driven by the pulser shaft 387 which extends outwardly of the differential support 321 and has secured thereto for rotation with it a cam disc or plate 435. As clearly shown in FIG. 7, the disc 435 is provided with a cam 436 which is arranged to open the contacts of a pair of normally closed switches, generally indicated by the reference numerals 437 and 438. The normally closed switches 437 and 438 are carried on the outer face of the differential support 321 and are positioned 180° apart, the two switches 437 and 438 being identical in construction.

As shown, the switch 437 comprises an arm 439 of a nonconducting material which is pivotally mounted on a bracket 440 secured to the front face of the differential support 321. The arm 439 extends downwardly into the path of travel of the cam 436 so that the face of the cam in moving through its circular path of travel in a clockwise direction will engage the end of the arm to move it rightwardly, as viewed in FIG. 7. The arm 439 is provided with an electrically conductive contact 441 which is adjustably secured therein in position to engage an electrically conductive stationary contact 442. The contact 442 is adjustably mounted in a nonconducting bracket 443 that is secured to the outer face of the differential support 321. To maintain the contact 441 in engagement with the contact 442 a spring 444 is provided. The spring 444 has one of its ends connected to the arm 439 while its opposite end is connected to a post 445 which extends outwardly from the differential support 321. The arrangement is such that when the cam 436 of the disc 435 is rotating in a clockwise direction it will engage the end of the arm 439 to effect a momentary separation between the contact 441 and the contact 442. Thus, the output of the "X" differential mechanism operates to rotate the disc 435 which in turn opens the normally closed switches 437 and 438 once in each revolution of the disc 435. When the switch 437 is opened, it effects a change in the state of its associated electronic flip-flop circuit 78 which is shown schematically in FIG. 8, to cause the flip-flop circuit to impress a magnetic pole of positive polarity on the magnetic tape that is moving over the recording head 44 by operation of the capstan 58. Similarly, when the switch 438 is opened it effects a change of state in the electronic flip-flop circuit 78 so that it resumes its original state and in doing so impresses a negative magnetic pole on the magnetic tape. These magnetic poles which are impressed upon the magnetic tape in response to the rotation of the take-off wheel 188 are recorded on a channel of the magnetic tape, referred to as the "X" channel, and each change in the polarity on the magnetic tape constitutes a pulse.

Similarly, to effect a reference input to the "Y" differential mechanism 296, as shown in FIG. 5 and diagrammatically in FIG. 11, the shaft 422 is provided with a gear 449 which is secured thereto for rotation with it. The gear 449 is disposed to drive a gear 450 that is mounted on a shaft (not shown) journalled in the "Y" differential support 344. The gear 450, in turn, operates to drive a gear 451 which is secured to the hub of a "Y" differential reference input bevel gear 452, shown in FIGS. 1 and 11, which is supported on a "Y" pulser shaft 453 for rotation relative to it, with the pulser shaft 453 being rotatably supported in the "Y" differential support 344. It is therefore apparent that the construction of the "Y" reference drive transmission is identical to the arrangement and construction of the "X" reference drive transmission, previously described in detail.

The "Y" differential mechanism 296, as shown in FIG. 1 and diagrammatically in FIG. 11, receives the output of the sphere 175 from the "Y" power take-off wheel 189 which is connected to drive the input bevel gear 403 and also receives the output of the reference drive through the input bevel gear 452. These outputs are resolved, by the "Y" differential mechanism 296, into a resulting output which is transmitted by the rotating "Y" pulser shaft 453 to rotate a "Y" pulser disc 455. As shown in FIG. 1 and diagrammatically in FIG. 11, the pulser disc 455 is secured to the extending end of the pulser shaft 453 and is provided with a cam 456 which operates upon rotation of the disc 455 to open a pair of normally closed switches (not shown) which are identical to the switches 437 and 438 associated with the "X" mechanical pulser 430. The switches (not shown) associated with the "Y" differential pulser, when actuated to an open condition, effect a change in the state of an associated "Y" channel electronic flip-flop (not shown) which is identical to the flip-flop circuit 78 for the "X" axis of slide motion. The "Y" channel flip-flop (not shown) is connected to another section of the recording head 44 and is actuated by the switches to impress magnetic poles of alternately positive and negative polarity on a "Y" channel of the magnetic tape.

As previously described in connection with the diagrammatic view of FIG. 8, alternate north and south magnetic poles, or pulses, are also recorded on a reference channel of the magnetic tape which is independent of the "X" and "Y" channels of the tape. However, while the "X" and "Y" pulses occur at a varying frequency in response to the operation of the ball transmission 144 to indicate a change in the motion of the two machine tool slides, the reference pulses are recorded at a constant frequency, which as previously mentioned, will be assumed to be 60 cycles per second in the present embodiment. The reference pulses are recorded by the operation of the flip-flop circuit 79, shown diagrammatically in FIG. 8, which operates in the same manner as the flip-flop circuit 78, the flip-flop circuit 79 being connected to that section of the recording head 44 which cooperates with the reference channel of the magnetic tape. The flip-flop circuit 79, as previously mentioned, is actuated by the reference pulser mechanism 460.

It will be observed from the diagrammatic view in FIG. 11 that the reference input to the "X" differential mechanism 295, the reference input to the "Y" differential mechanism 296, and the reference pulser mechanism 460, are all driven from the reference drive shaft 100 which is driven at a constant rate by the motor 22 through the gears 84, 98 and 99. Thus, the bevel gear 415 is keyed to the reference drive shaft 100 and it drives the two bevel gears 416 and 417 in unison. The bevel gear 417 transmits the reference input to the "Y" differential mechanism 296 through the gears 449, 450, 451 and 452. In like manner, the bevel gear 416 transmits the reference input to the "X" differential mechanism 295 through an identical gear train comprising the gears 423, 424, 426 and 427. In addition, the reference cam disc 461 of the reference pulser mechanism is mounted on the shaft 425 with the gear 424, as shown in FIG. 7 and diagrammatically in FIG. 11, so that the cam disc 461 rotates in unison with the gear 424, the latter of course, being driven from the reference drive shaft 100 through the gears 416 and 423.

The disc 461 is provided with a cam 462 which is arranged to open a pair of normally closed switches 463 and 464 that are spaced 180° apart, as shown in FIG. 7. The switches 463 and 464 are identical to the switches 437 and 438, previously described, and operate to change the state of the reference electronic flip-flop circuit 79 which is shown schematically in FIG. 8. When the switch 463 is actuated to an open condition it interrupts the circuit to the flip-flop 79 to effect a change in the state of the circuit to thereby effect a recording of a magnetic pole of positive polarity on the magnetic tape. When the switch 464 is actuated to an open condition it operates to change the state of the associated flip-flop circuit back to its original state and thereby effect a recording of a magnetic pole of negative polarity on the tape. The flip-flop circuits or square wave generators are contained within a protective casing 458 mounted on a platform 459 on which the entire tape recording apparatus is supported.

Therefore, three channels of intelligence will have been recorded on the tape; the "X" channel which will function to control motion of a machine slide member in an "X" direction; the "Y" channel which will function to control the motion of another machine slide member in a "Y" direction; and the reference channel to which the "X" and "Y" channels are related. On a playback of the magnetic tape in the control mechanism of a machine tool the reference channel recorded on the tape will serve to synchronize the control of the machine tool so that the motion of the slide members thereof will respond in exact accordance with the frequency of the electrical pulses obtained from the "X" and "Y" channels relative to the frequency of the pulses obtained from the reference channel.

Thus, for the purpose of the present description it is assumed that as previously mentioned, the gear ratios are arranged so that the reference mechanical pulser is operated at a rate to cause the recording of reference pulses on the reference channel at a constant frequency of 60 cycles per second. At the same time the reference input is likewise transmitted from the reference drive shaft 100 to the bevel gear 427 of the "X" differential mechanism 295. The gear ratios in the drive train to the differential mechanism 295 are arranged so that if the reference input to the bevel gear 427 is operating alone to drive the differential mechanism 295, the latter will rotate the cam disc 435 of the "X" mechanical pulser at a rate to produce a recording of the pulses on the magnetic tape at a frequency of 60 cycles per second. Therefore, in the absence of any other influence, the reference input to the differential mechanism 295, operating alone, would cause a recording of the pulses on the "X" channel of the type at a frequency of 60 cycles per second which corresponds with the frequency of the pulses recorded on the reference channel of the tape. Such correspondence in the two frequencies indicates that there is to be no motion along the "X" axis and the "X" machine tool slide is to remain at rest. A motion along the "X" or "Y" axes is indicated when the frequency of the pulses on the "X" or "Y" channels respectively deviate from the frequency of the pulses on the reference channel.

Such deviation in the frequency of the pulses on the "X" channel is obtained by the operation of the ball transmission 144. The output of the ball transmission through the "X" take-off wheel 188 is transmitted through the gear train previously described to the bevel gear 386 of the differential mechanism 295 to constitute the "X" input to the differential mechanism. This "X" input is added algebraically to the reference input transmitted to the bevel gear 427 to either increase or decrease the rate of rotation of the cam disc 435 of the mechanical pulser 430 depending upon the direction of rotation of the take-off wheel 188. If the take-off wheel 188 is rotated in a direction to cause rotation of the bevel gear 386 in what may be termed a positive direction, its input will be added by the differential mechanism 295 to the reference input to increase the rate of rotation of the cam disc 435 so that the pulses will be recorded on the "X" channel of the magnetic tape at a frequency greater than 60 cycles per second. Since the frequency of the "X" pulses is greater than the reference frequency, the motion along the "X" axis will be in a positive direction, and the more the frequency on the "X" channel exceeds 60 cycles per second, the faster the rate of travel that is called for along the "X" axis in a positive direction.

On the other hand, if the take-off wheel 188 is rotated in the opposite direction it will cause rotation of the bevel gear 386 in the opposite, or what may be termed a negative direction. The "X" input to the differential mechanism will then be subtracted rather than added to the reference input by the differential mechanism to decrease the rate of rotation of the cam disc 435 so that the pulses will be recorded on the "X" channel of the magnetic tape at a frequency that is less than 60 cycles per second. Since the frequency of the "X" pulses is less than the reference frequency the motion called for along the "X" axis will be in a negative direction, and the lower the frequency of the pulses on the "X" channel below 60 cycles per second, the faster the rate of travel that is called for along the "X" axis in a negative direction.

The apparatus operates in an identical manner to record the same data for controlling the motion along the "Y" axis. The reference input from the reference drive shaft 100 is transmitted from the gear 417 to the bevel gear 452 of the "Y" differential mechanism 296 to constitute the reference input to the "Y" differential mechanism. The movement along the "Y" axis is determined by the input to the "Y" differential mechanism from the "Y" take-off wheel 189 of the ball transmission 144, the rotation of the take-off wheel 189 being transmitted through the previously described gear train to the bevel gear 403 of the "Y" differential mechanism 296. This input is either subtracted or added to the reference input from the bevel gear 452 by the differential mechanism depending upon the direction of rotation of the take-off wheel 189 to regulate the rate of rotation of the cam disc 455 and thereby control the frequency of the pulses recorded on the "Y" channel of the magnetic tape. On playback of the record, the frequency of the pulses on the "Y" channel of the tape is compared with the frequency of the pulses on the reference channel of the tape to establish the motion along the "Y" axis in the same manner as described for the "X" axis. It is therefore apparent that the motion along both the "X" and "Y" axes may be established by simply steering the drive wheel 161 of the ball transmission 144 to adjust the distribution of the output amongst the two take-off wheels 188 and 189.

It is essential that the operator of the apparatus be apprised of the amount of movement recorded along both the "X" and "Y" axes during the operation of the machine. To this end, a pair of mechanical counters 467 and 468 are provided, as illustrated in FIGS. 2, 5, 7 and 11. The counter 467 is connected to indicate the amount of movement recorded along the "X" axis, while the counter 468 is arranged to indicate the amount of movement recorded along the "Y" axis. The two counters 467 and 468 are therefore driven by the output of the take-off wheels 188 and 189, respectively.

To this end, as shown in FIGS. 2, 5, 6 and 11, the "X" counter 467 has an actuating shaft 470 and a driving gear 471 keyed to the end of the shaft 470. The gear 471 is in meshing engagement with the gear 371 which is a part of the gear train that transmits the drive from the "X" take-off wheel 188 to the "X" differential mechanism 295. In like manner, as shown in FIGS. 1, 5 and 11, the "Y" counter 468 includes an actuating shaft 466 with a driving gear 472 being keyed to the end of the actuating shaft 466. The driving gear 472 is in meshing engagement with the gear 398 which is a part of the gear train that transmits the drive from the "Y" take-off wheel 189 to the "Y" differential mechanism 296.

It is therefore apparent that the counters 467 and 468 are actuated by the rotation of the two take-off wheels 188 and 189 respectively and they are calibrated for indication in terms of inches of movement recorded on the tape with the reading on the counters being divided into thousandths of an inch so that a movement can be accurately recorded to one-thousandth of an inch. When the take-off wheels 188 and 189 are rotated in a direction to record positive movement of the machine tool slides, the counters 467 and 468 are driven in a direction to add the distance of movement to their reading. On the other hand, when the take-off wheels 188 and 189 are rotated in the opposite direction to record negative movement of the machine tool slides, the counters 467 and 468 are driven in a reverse direction to subtract the distance of movement from their reading. As a result, if a path of travel of a cutter relative to a workpiece is recorded with the counters 467 and 468 indicating a zero reading at the starting point, and the data recorded on the record produces a movement or a series of movements relative to the workpiece that returns the cutter to its starting position relative to the workpiece, the counters 467 and 468 will again indicate a zero reading so that they provide a convenient check on the accuracy of the record.

As previously described, the frequencies of the pulses recorded on the "X" and "Y" channels of the magnetic tape govern the rate at which the "X" and "Y" machine slide members will be moved in response to the playback of the magnetic tape. Since the outputs of the two differential mechanisms 295 and 296 operate the mechanical pulsers associated therewith, which, in turn, operate the electronic flip-flop circuits to record the pulses in the form of changes in polarity on the magnetic tape, the frequency of the pulses on the "X" and "Y" channels of the magnetic tape may be increased or decreased by varying the "X" and "Y" inputs to the differentials 295 and 296 by regulating the rate of rotation of the take-off wheels 188 and 189, respectively.

The feed rate at which the cutter will move relative to the workpiece upon playback of the record for a given rate of movement of the magnetic tape past the reading head is determined by the rate of rotation of the sphere 175 which may be varied by adjusting the speed changer 118. However, once this rate of rotation is established for a particular recording operation it need not be further adjusted and the sphere may be rotated at a constant rate. With the sphere 175 rotating at a constant rate, the drive wheel 161 is steered to adjust the distribution of the output of the ball 175 amongst the two take-off wheels to produce the data which is recorded on the magnetic tape and that will, on playback of the record, control the operation of the two machine tool slides along the "X" and "Y" axes.

The rate of rotation of the sphere 175 may be varied by adjusting the speed ratio of the speed changer 118 which is accomplished by manipulating a knob 501, shown in FIGS. 2 and 10, that is secured to the outwardly extending end of a horizontally disposed shaft 502 rotatably supported in the upper transmission casting 27. The shaft 502 is operatively connected to the speed changer adjusting shaft 123 by a suitable bevel gear in the same manner as the shaft 476 is connected to the adjusting shaft 253 of the speed changer 242.

Rotation of the knob 501 will operate to effect a setting of the speed changer 118 which, in turn, will operate to rotate a shaft 503 operably connected therein. The shaft 503 extends outwardly from the speed changer 118 through the upper transmission casting 27 to extend through an indicator gear box 504 secured to the side of the casting 27. The shaft 503 extends through the gear box 504 and is provided with a dial 505 having suitable indicia readable against an indicator mark (not shown). The indicia on the dial 505 are in full units ranging from the lowest setting of the speed changer 118 to the highest setting of the speed changer. However, the speed changer 118 is capable of being adjusted to settings which are fractions of units, therefore, suitable auxiliary dials 506, reading in tenths of a unit, and 507, reading in hundredths of a unit are provided. A suitable chart (not shown) is provided on which comparable feed rates in inches per minute are given for every setting of the speed changer 118. Thus, for a particular feed rate, the comparable dial setting number may be determined from the chart (not shown) and the knob 501 manipulated until that number appears on the dials. Thus, a desired setting of the speed changer 118 may be accomplished by manipulating the knob 501 to thereby effect the spacing of the pulses on the magnetic tape at desired intervals so that on playback the information stored on the "X" and "Y" channels will function to operate the machine member to produce a desired feed rate of the cutter relative to the workpiece.

The operation of the apparatus set forth above will be described for recording data which may be subsequently employed to control the movement of two members of a machine tool to establish relative movement between a cutter and a workpiece which will reproduce in a workpiece 511 the configuration depicted in FIG. 13. The outline of the workpiece is shown by a solid line while a broken line 512 represents the path of travel of the center of a cutter which will produce the contour of the workpiece 511 in an actual work operation upon playback of the tape in a machine tool. The workpiece 511 is located in respect to the "X" and "Y" coordinates in the upper right hand quadrant so that all dimensions in respect to the datum or zero point will be positive. As shown, the datum or zero point is indicated as point 1 and is listed in the chart of FIG. 14 with the numerical description of the point as related to the "X" and "Y" axes being given as 0.0000 and 0.0000. For the sake of convenience the path of travel 512 of the center of a cutter to be employed to generate the desired configuration will be described. It is to be understood that although the center of the cutter will travel along the path indicated by the broken line 512, the periphery of the cutter will be machining the workpiece 511 along its outline as indicated by the solid line to produce the desired configuration.

It is only necessary to refer to certain key points of the path of travel 512 such as a point 3 which is the tangent point of a line 535 and a curve 536. The point 3 for this particular outline is the selected point of first contact between the cutter and the workpiece. In order that the cutter be progressed into the workpiece in a smooth manner it is desirable that it approach point 3 on a line which is tangent to the curve. Therefore, from the zero point or point 1 the cutter is caused to move along the "X" axis to a point 2 which is 1.0000 inch from the "Y" axis and the coordinates of this point are duly noted in the respective column of the chart in FIG. 14. The coordinates of point 3 which is the next control point is now described and duly noted.

For paths of travels which are straight lines the slope of the line must be given so that the steering wheel 161 of the resolver may be orientated to effect rotation of the sphere 175 in a plane corresponding to this direction. Thus, for the path of travel between points 1 and 2 the slope is 0° and is noted in the chart of FIG. 14.

The next control point is where the path of travel has a change of direction, and in this example is at point 4 which is the tangent point of the line 535 and a curve 537. Since, the curve 537 is a portion of a true circle it is only necessary that the end points be given which are represented as point 5 and point 4 with the latter also representing the end point of the straight side of the workpiece. With the end points 4 and 5 of the curve 537 it is also necessary to note the radius of the curve which is 1.5 inch and this is the radius of the cutter center line path. The entire workpiece is programed in this manner, thus, the next key point is point 6 and the "X" and "Y" coordinates of the point noted in the chart of FIG. 14 with the slope of the line also being given as 355°. The next key point is point 7 followed by point 8 and a return to point 3, the point of first contact. When the return is made to the initial point 3 it will be necessary to program a retraction of the cutter from the workpiece to the zero point or point 1. Thus, the cutter path to the zero point 1, as shown in FIG. 13, and as being from point 3 to a point 9, is the path that the cutter will be made to travel to move directly away from the workpiece to avoid the possibility of marring the finished surface of the workpiece and return to the zero point from point 9. With the programmed workpiece described in terms of "X" and "Y" coordinates, these coordinate points may be used as input data to be recorded on magnetic tape in the form of square waves which represent a pattern of motion reflecting a continuous path of movement.

The following is a detailed description of the operation of the apparatus of the present invention to record data which may be subsequently employed, on playback of the record, to control the movement of machine tool slides to effect relative movement between a cutter and a workpiece for reproducing the workpiece 511 depicted in FIG. 13.

Referring to the programmed workpiece, shown in FIG. 13, it will be noted that it is desired that the machine slide members operate in a manner to effect a path of travel of the tool which corresponds to a line extending between the zero point or point 1 and point 2, as shown in FIG. 13. Since the line extending between points 1 and 2 is along the "X" axis, the slope of the line is 0°. Therefore, the drive wheel 161 must be oriented or positioned in a direction to effect maximum output of the sphere 175 along the "X" axis with no output being effected along the "Y" axis. That is, the take-off wheel 188 must be driven at maximum speed while the take-off wheel 189 is maintained stationary.

To effect positioning of the steering wheel 161 to a desired orientated position, the steering adjusting shaft 260 is manually rotated until a dial indicator 513, shown in FIGS. 1 and 11, having 360° of indicia thereon readable against an indicator 514, is rotated to a position to indicate a zero degree reading. The 360° indicating dial 513 is conveniently secured to the top surface of the gear 303 which will rotate one complete revolution for every 360° of bodily pivotally movement of the steering wheel 161. Positioning of the steering wheel 161 may be effected to a hundredth of a degree. To this end an auxiliary dial 510 is provided which is secured to the upper end of the shaft 260 for rotation with it and cooperates with a hundredth vernier scale 509 mounted on the casting 24 below the dial 510. With this arrangement, accurate positioning of the steering wheel 161 may be effected to a hundredth of a degree.

To effect positioning of the steering wheel 161 to a zero degree setting, the steering adjusting shaft 260 is manually rotated until the dial 513 is orientated to a position to indicate a zero degree reading. The accuracy of the setting will be established by aligning the zero point on the tenths dial 510 with the zero point on the vernier scale 509. With a zero degree setting accomplished, the drive wheel 161 will have been positioned so as to drive the sphere or ball 175 about an axis which will effect maximum output drive to the "X" take-off wheel 188 while imparting no drive to the "Y" take-off wheel 189.

A manually actuatable brake 515 is operated to positively lock the shaft 260 in the adjusted position so that inadvertent displacement of the shaft 260 may not occur.

With the drive wheel 161 orientated in a fixed position for straight line motion, a power input to the steering transmission will not be necessary. Therefore, the steering transmission directional clutch shaft 217, shown in FIGS. 3 and 11, must be moved to its intermediate position wherein the groove 287 provided on the shaft 217 receives the ball detent 289. In this position the shaft 217 operates to effect a disengagement of the clutch gear 216 from the drive gear 215 and the idler gear 221, the clutch gear 216 being moved to a position intermediate the gears 215 and 284. Actuation of the shaft 217 to its intermediate position will also act to move the clockwise drive gear 283 upwardly but not far enough to effect its engagement with the gear 226. Thus, the drive from the input shaft 212 to the steering transmission is effectively disconnected.

With the drive wheel 161 positioned so as to obtain the desired output to the take-off wheels 188 and 189 and the speed changer 118 adjusted to the desired feed rate setting, the apparatus may be operated so as to record on the magnetic tape the machine tool slide motion desired with the apparatus being operated in accordance with the numerical description of the programmed cutter center line path of travel with respect to the "X" and "Y" coordinates as presented in FIG. 14. To initiate operation of the apparatus, the operator will actuate a master switch 540 located on a control panel 541, shown in FIGS. 1 and 2, and which serves to connect the apparatus to a source of power and energizes the torque motors 300 and 301. Thus, the apparatus is conditioned for operation and the torque motors are operating to eliminate backlash that might exist in the steering transmission and drive wheel transmission. With the apparatus conditioned for operation, the operator will actuate an operating switch 542 which acts to effect operation of the base motor 22 and the electric motors (not shown) of the reels 32 and 71. Operation of the base motor 22 effects a drive to the ball transmission 144 through the reduction transmission R1 previously described. At the same time, the base motor 22 also serves to drive the tape capstan 58 through the capstan drive transmission to effect movement of the magnetic tape over the recording head 44. Simultaneously with effecting a drive to the ball and capstan, the base motor 22 operates to effect a reference input to both of the differential mechanisms 295 and 296 and also to drive the reference mechanical pulser 461 to record the pulses on the reference channel of the magnetic tape at the reference frequency of 60 cycles per second.

With the apparatus set to obtain a center line path of travel of the cutting tool to correspond to the line extending between point 1 and point 2 the base motor will be operated until just prior to when the "X" counter 467 reads 1.0000, as indicated for point 2 under the "X" column in the chart of FIG. 14. The "X" counter is caused to finally indicate 1.0000 by manual operation of handwheel 91. At this time the "Y" counter 468 will indicate its 0.0000 setting since there has been no output to the "Y" take-off wheel 189. During the time interval that the base motor 22 was driving the ball 175 the reference mechanical pulser 461 will have been operated to record the pulses on the reference channel of the magnetic tape at the reference frequency of 60 cycles per second. Since there has been no "Y" input into the "Y" differential mechanism 296, during this time, the "Y" mechanical pulser 455 will have been operated to effect a corresponding recordation of 60 cycles per second on the "Y" channel so that no motion is called for along the "Y" axis. However, since the "X" differential mechanism 295 received an "X" input from the take-off wheel 188 in a positive direction, in addition to the reference input, the pulses on the "X" channel will be recorded at a frequency in excess of 60 cycles per second to call for machine tool slide motion along the "X" axis in a positive direction. Furthermore, such input to the differential mechanism 295 was continued until the counter 467 indicated one inch of slide movement, so the pulses at the increased frequency were continued on the "X" channel of the tape until a sufficient number of pulses were recorded to produce one inch of slide movement upon playback of the record.

Referring once again to FIG. 13, the next path of travel which would ordinarily be effected is from point 2 to point 3. Normally this path would be independently recorded. However, in the particular example of a workpiece shown, a line from point 2 to point 3, when extended, will pass through point 4 with no change in slope. Therefore, the next desired center line path of travel of the tool may be taken as extending from point 2 to point 4.

To this end, since the slope of the line extending between point 2 and point 4 is parallel to the "Y" axis, the brake 515 will be released and the shaft 260 rotated until a 90° repositioning of the drive wheel 161 is effected to relocate the axis of rotation of the sphere 90° from its preceding position. When the desired positioning of the drive wheel 161 has been accomplished the brake 515 will again be reset to insure that the drive wheel 161 will remain in the selected position. In this position the drive wheel 161 will operate to drive the sphere 175 to effect maximum output to the "Y" take-off wheel 189 and no output to the "X" take-off wheel 188. With the drive wheel 161 orientated in a fixed position, power input to the steering transmission will not be necessary. Therefore, the directional clutch shaft 217 is left in the neutral intermediate position. Since, the feed rate has been previously established and set, the setting of the speed changer 118 will remain unchanged.

The base motor may now be connected to complete a drive to the sphere, the tape capstan and the reference. The base motor 22 will be operated until just prior to when the "Y" counter 468 indicates a reading of 9.7500, as indicated in the chart of FIG. 14, under the "Y" column for point 4. The "Y" counter is caused to finally indicate the desired reading by manual operation of the hand wheel 91. Since there is no input along the "X" axis the "X" counter 467 will remain unchanged and indicate a reading of 1.0000.

Referring again to FIG. 13, the next path of travel to be effected is from point 4 to point 5 which in this particular case is a portion of a circle having a radius of one and one-half inches. The direction of this curve is in a clockwise direction. In order to effect a path of travel as defined by the curve extending between point 4 and point 5 it is necessary that both machine slide members be operated simultaneously in sine-cosine relationship. To record this required motion on tape it is necessary to continuously orientate the drive wheel 161 relative to the sphere 175 to drive the sphere about a continuously varying axis to thereby continuously vary the rate of rotation of the take-off wheels 188 and 189 while maintaining the sine-cosine relationship. To this end, the directional clutch shaft 217 is moved downwardly so as to effect a meshing engagement of the gear 216 with the drive gear 215 and the idler gear 221 and thereby effect a drive connection between the base motor drive transmission and the steering transmission in a clockwise direction. It is also necessary that the axis of the drive wheel 161 be rotated bodily at a selected rate in order that the curve generated through the coordinated movement of the two machine slide members will have the specified radius. To this end, the rate changer 242 is adjusted to a desired setting for producing the one and one-half inch radius which setting may be determined from the equivalency chart (not shown) previously mentioned. As the rate changer 242 is adjusted, the dial reading will indicate when the desired setting has been obtained. It is well to note that the higher the setting of the rate changer 242 the smaller will be the radius effected, because the faster that the axis of the drive wheel 161 is rotated bodily the faster will be the rate at which the axis of rotation of the sphere is varied.

Since the feed rate of 45 inches per minute has been previously set on the speed changer 118 no additional adjustment thereof is necessary. The next step is to release the brake 515 so that the steering of the drive wheel 161 will be accomplished. With the apparatus set for operation, the base motor 22 will be operated until just prior to when the "X" counter 467 indicates 2.8807 and the "Y" counter 468 indicates 11.4943, these being the coordinates of point 5 as determined from the chart of FIG. 14 and these two indications on the counters will be arrived at simultaneously by reason of the combined affect of the established rate of steering of the drive wheel 161 and its rate of rotation about its own axis. The "X" and "Y" counters are finally caused to indicate the desired coordinates by manual operation of the handwheel 91. During this operating interval the apparatus has recorded on tape magnetic poles of alternate positive and negative polarity which are referred to as pulses on the "X" and "Y" channels and the reference channel, which on playback of the tape will effect movement of the machine slide members to produce a center line path of travel of the cutter which corresponds to the curve between point 4 and point 5. The radius to be established is therefore dependent on both the rate of steering of the drive wheel 161 as well as the rate of rotation of the drive wheel 161 about its own axis and both rates may be ascertained from the previously mentioned equivalency charts.

Referring again to FIG. 13, the next path of travel to be effected is from point 5 to point 6. Since this line is a straight line the directional shifter shaft 217 will be moved to its neutral position to disconnect the drive between the drive transmission and the steering transmission. The slope of the line must be set into the apparatus. The slope of the line is established from the "X" axis, the positive side of which is in the zero degree direction, the slope being measured in a counterclockwise direction from the positive "X" axis. Therefore, the slope of the line between points 5 and 6 is 355°. Since, the drive wheel 161 is already positioned at 355°, by reason of its operation for the curve between points 4 and 5, no positioning of the drive wheel is necessary. With the drive wheel 161 positioned, the brake 515 will be set to maintain it in the desired position. In this position the drive wheel 161 will effectively rotate the sphere 175 about an axis which is parallel to the axis of rotation of the drive wheel 161. The distribution of power to the take-off wheels 188 and 189 will be such that the take-off wheel 188 will be driven at a speed somewhat less than maximum, while the take-off wheel 189 is driven at a very slow speed, but in a sine-cosine relationship; or, as previously stated, the speed of either of the take-off wheels 188 and 189 will vary as the cosine of the angle that the axis of rotation of the sphere 175 makes with the axis of the take-off wheel. With the steering transmission neutralized after the axis of rotation of the drive wheel 161 has been set to determine the slope of the line between the points 5 and 6, and the feed rate set from previous operation, the base motor 22 may be operated until just prior to when the "X" counter 467 indicates 11.2834 and the "Y" counter 468 indicates 10.7528 which are the coordinates of point 6. The "X" and "Y" counters are finally caused to indicate the desired coordinates by manual operation of the handwheel 91 and these two readings will be arrived at simultaneously by reason of the setting of the machine.

The next path of travel to be recorded is the curve between point 6 and point 7 having a radius of one and one-half inches. The direction of this curve from point 6 to point 7 is in a clockwise direction. The directional clutch shaft 217 must be moved to its lowermost position to effect a driving connection between the drive transmission and the steering transmission in a clockwise direction. The brake 515 is released so that the steering transmission may be free to operate. The speed rate changer 242 is now adjusted to effect the desired setting for accomplishing the one and one-half inch radius, which setting will be indicated on the dials 482, 487 and 488 when the desired adjustment has been obtained. Again there is no need to adjust the feed rate changer 118 since this has previously been set. With the desired adjustments made, the base motor 22 will be operated until just prior to when the "X" counter 467 reads 12.3683 and the "Y" counter 468 reads 7.7721, which readings are the coordinates of point 7, as indicated in the chart shown in FIG. 14. Final readings are arrived at by manual operation of the handwheel 91.

For center line path of travel of the cutter between point 7 and point 8, which is a straight line, it is again necessary to move the shaft 217 axially to its neutral or intermediate position to disconnect the drive transmission from the steering transmission. The slope of the line between point 7 and point 8 is 225° in a counterclockwise direction from the positive side of the "X" axis with the "X" axis passing through point 7. The drive wheel 161 is positioned at the desired line slope of 225° by reason of its operation in the preceding operation upon the completion of the radius from point 6 to point 7. The brake 515 is then set to effectively lock the drive wheel in the desired orientated position. Since the feed rate has been previously established, the base motor 22 may be operated until just prior to when the "X" counter 467 reads 6.5481 and the "Y" counter 468 reads 1.9519 which readings are the "X" and "Y" coordinates of point 8. The desired coordinates are caused to be indicated on the respective counters by manual operation of the handwheel 91.

The remaining information to be recorded on the tape is the curve 536 between point 8 and point 3 having a radius of three inches, where point 3 is the tangent point of the curve and the line representation of the center line path of cutter travel that has previously been recorded. Thus, the clutch shaft 217 will be moved to its lowermost position, as shown in FIG. 3, and the brake 515 released to thereby effect a steering of the drive wheel 161 as it operates to rotate the sphere 175. The rate changer 242 will then be adjusted until the reading on the dials 482, 486 and 488 of the indicator show that a desired setting of the rate changer 242 for producing a three inch radius, as determined from the chart (not shown), has been obtained. The operator will now actuate the switch 542 to effect operation of the base motor 22 which will be continued until just prior to when the "X" and "Y" counters 467 and 468 indicate a reading of 1.0000 and 4.2500, respectively. These readings are the coordinates of point 3. The counters are finally caused to indicate the desired coordinate points by manual operation of the handwheel 91.

At this point the cutter may be separated from the workpiece and such separation is preferably effected by a relative movement of the cutter directly away from the workpiece so that the cutter will not mar or damage the finished surface of the workpiece. To this end, a path of travel will be recorded that is represented by the line between points 3 and 9, shown in FIG. 13. The line between these points is a straight line which is parallel to the "X" axis. Therefore, with the direction of the line being from point 3 to point 9 the slope is 180°. The direction clutch shaft 217 is moved to its neutral position and the steering shaft 260 rotated manually so as to orientate the drive wheel 161 to the desired position of 180° as indicated on the dials 513 and 510. The brake 515 is then set to maintain the drive wheel in the orientated position. In this particular example the retraction of the tool will be at the feed rate of forty-five inches per minute. Therefore, since the speed changer 118 has been maintained at a seting to yield this feed rate there is no need to adjust the speed changer. The base motor is operated until just prior to when the "X" counter 467 reads 0.0000 and the "Y" counter 468 reads 4.2500, these readings being coordinates of point 9, as shown on the chart of FIG. 14. Final readings are obtained by manual operation of handwheel 91. The remaining step is to effect a return of the cutter to its original start position at point 1 or the zero point of the "X" and "Y" axes. Thus, it is only necessary to release the brake 515, rotate the shaft 260 to orientate the drive wheel 161 to 270° and then reset the brake. The base motor 22 will now be operated until just prior to when both of the "X" and "Y" counters indicate a reading of 0.0000. Final readings are arrived at by operation of handwheel 91.

The apparatus may be conveniently arranged for operation to produce tape for a playback rate of one and seven-eighths inches per second and at this tape speed will produce a reference frequency of 60 cycles per second with the machine feed screw operating to effect a machine tool slide motion of one-fourth inch for each revolution of the screw. With the above stated factors and the proper ratios of the transmissions R*l*, R*b*, R*s* and R*o*, the apparatus will be operative for a feed rate range between two-tenths of an inch per minute to one hundred and sixty-eight inches per minute by adjusting the infinitely variable speed changer 118 and the change gears 108 and 109 to obtain the desired feed rate within the stated limits. However, the present apparatus may be conditioned for other reference frequency cycles where the pitch of the machine tool slide screw is different and where the rate of tape playback is also different. For example, assuming that a reference frequency of 200 cycles per second is selected and the machine slide screw has a pitch to effect machine slide motion of one-tenth of an inch per screw revolution, with a tape playback rate of fifteen inches per second it will be necessary to provide a 10 to 1 ratio for the transmission R*o*. Since the transmission R*o* for the "X" axis comprises a change gear 356 and the fixed gears 358, 357, 371, 372, 379, 380, 384 and 385 the ratio of the transmission may be changed by substituting a suitable gear for the change gear 356. In like manner, the R*o* transmission for the "Y" axis may be changed by substituting a like suitable gear for the change gear 395. With the substitution of suitable gears for the change gears 356 and 395 which will establish a ratio of 10 to 1 for the transmissions, the feed rate range will be one inch per minute to five hundred sixty inches per minute with the radius range remaining unchanged. This is established from the equation:

$$\text{feed rate } V \text{ (in inches/min.)} = \frac{60 \times C \times f}{Rl \times Ro \times Ro}$$

$$\text{radius } R = \frac{C \times Rs}{2 \times Ro \times Rb}$$

where C represents inches of slide motion per revolution of the slide actuating screw and $f$ represents the reference frequency.

Or, the capstan diameter may be changed and may be calculated from the equation:

$$D \text{ (in inches)} = \frac{Vt \times Rt}{\pi \times f}$$

where $Vt$=playback velocity of tape in inches per second,
$Rt$=ratio of the tape transport transmission,
$f$=reference frequency in cycles per second,
therefore capstan diameter=

$$\frac{15 \times 64}{\pi \times 200} \text{ or } 1.5279 \text{ inches}$$

Thus, it will be necessary to alter the tape capstan end 58 which engages the magnetic tape to move it across the recording head 44, so that its diameter will be 1.5279 inches. With the above changes accomplished the apparatus is now operable to make magnetic tape for a machine tool where the lead screw of the machine slide has a pitch which is equal to one-tenth of an inch of machine slide motion at a reference frequency of 200 cycles per second and a tape playback rate of fifteen inches per second.

The invention has been described at it relates to two dimensional machine positioning control wherein an input of values characteristic of a tool path along "X" and "Y" axes may be recorded. However, mechanism has also been provided to enable a third dimension of machine position control to be recorded along an orthogonal "Z" axis in addition to the "X" and "Y" axes. To this end, as shown in FIGS. 7, 11 and 12, there is provided a third differential mechanism 550 for the "Z" axis, which is operable to control the rise and fall of a third machine tool slide member in a plane perpendicular to the plane of the workpiece which contains the "X" and "Y" axes. The third differential operates to summate an input from the reference input drive and an input derived from a reduction transmission 549 driven from the reference drive transmission. The "Z" differential mechanism is supported in a frame 551 which is secured to the differential support 321. The "Z" differential mechanism 550 is identical in construction and operation to the "X" and "Y" differential mechanisms 295 and 296, respectively. The "Z" differential mechanism 550 comprises a pulser shaft 552 journalled in a pair of antifriction bearings 553 and 554 carried in suitable openings provided in the walls of the housing 551. A pair of input bevel gears 556 and 557 are mounted on the pulser shaft 552 for free rotation relative to the shaft. The bevel gears 556 and 557 are in meshing engagement with a bevel gear 558 rotatably mounted on a stub shaft (not shown) that extends outwardly from a carrier 559. The carrier 559 is fixedly supported on the pulser shaft 552 to effect its rotation whenever the input bevel gears operate to effect orbital movement of the bevel gear 558 about the bevel gears 556 and 557.

In the illustrated embodiment the reference input to the "Z" axis differential mechanism 550 is taken from the reference drive gear 426 of the "X" differential mechanism 295 although it should be understood that such reference input may be taken from another portion of the reference drive it only being necessary that the reference input to the "Z" differential mechanism 550 be identical to the reference inputs to the "X" and "Y" differential mechanisms 295 and 296. The reference input to the "Z" differential 550 is transmitted from the reference drive gear 426 by means of an idler gear 561, shown in FIG. 11, rotatably supported in the differential support 321. The idler gear 561 has meshing engagement with a drive gear 562 fixedly mounted on a hub portion of the reference input bevel gear 556 of the differential mechanism 550.

The control motion input to the differential 550 is derived from the reduction transmission 549. The reduction transmission 549 is driven from the reference drive gear 562, shown in FIG. 12, through a gear wheel 565 which is fixedly secured to a shaft 566 rotatably supported in the housing 551. A pinion 567 fixedly secured to the shaft 566 for rotation with it is disposed in meshing engagement with a gear wheel 568. The gear wheel 568 is secured to a countershaft 569 rotatably supported by a rear wall 571 of the housing 551 and a transmission housing 572 screw fastened to the wall 571 of the housing 551. The countershaft 569 is provided with a pinion 573, which is secured to the shaft 569 so as to rotate with it, being adapted to drive a gear wheel 574. The gear wheel 574 operates to effect an input to an infinitely variable speed changer 575, which is identical to the speed changer 118 and is disposed within a suitable opening provided in the transmission housing 572. An input shaft 576 of the speed changer 575 receives the gear 574 in a manner so that rotation of the gear 574 will operate to drive an infinitely variable transmission (not shown) contained within the speed changer, in a well known manner. The speed changer 575 is provided with an output shaft 578, the extending splined end of which is adapted to rotatably drive a shiftable gear couplet 580, in a well known manner.

The gear couplet 580 includes a relatively small pinion 581 and a relatively large gear wheel 582 that are adapted to mesh one at a time, respectively, with an idler gear 583 or a positive direction drive gear 584, the cooperating gearing constituting a reversing drive for the reduction transmission. The gear couplet 580 is shiftable selectively to any one of three positions, namely; a neutral position wherein the gears 582 and 581 of the couplet will be positioned between the gears 584 and 583, respectively; a positive direction drive position wherein the gear 582 is in meshing engagement with the gear 584; or, a negative direction drive position wherein the pinion 581 is in meshing engagement with the idler gear 583. The positive direction drive will produce the recording of information that will effect movement of a machine slide member upwardly which may be considered as the positive direction. The negative direction drive will therefore produce the recording of information that will effect movement of the machine slide member downwardly which may be considered as the negative direction.

The gear wheel 582 of the gear couplet 580, when in the position shown in FIGS. 11 and 12, operates to drive the gear 584 in a direction to effect rotation of the bevel input gear 557 in the same direction as the bevel reference input gear 556 is being rotated. To this end, the gear 584 is secured to a shaft 591 horizontally journalled in the transmission housing 572, the shaft 591 having on its inner end a pinion 592 fixedly secured thereon. The pinion 592 meshes with a drive gear 593 mounted on a hub portion of the input bevel gear 557 in a manner to effect rotation of the input gear 557.

To effect a reverse direction of rotation of the input bevel gear 557 relative to the direction of rotation of the input bevel gear 556, designated as a negative direction drive, a lever 586, shown in FIG. 7, is actuated to effect a shifting of the gear couplet 580 in a direction to engage the pinion 581 with the idler gear 583. As shown in FIGS. 11 and 12, the idler gear 583 is disposed in meshing engagement with a reverse drive gear 596 which is secured to the shaft 591 in a manner to effect its rotation. The drive connection established through the pinion 581, the idler gear 583 and the reserve drive gear 596 rotates the shaft 591 in a direction opposite to the direction in which the shaft 591 is rotated when its drive train is completed through the gears 582 and 584. Therefore, the pinion 581, the idler gear 583 and the gear 596 function to drive the gear 593 in a reverse or negative direction relative to the direction that the gear 562 is rotated. It is to be understood that the ratio of the gears in the reverse or negative drive transmission will be such as to effect rotation of the gear 593 at the same speed as is effected through the positive drive transmission.

The gear couplet 580 is shiftable on the output shaft 578 to one or the other of its two drive positions by means of the manually actuable lever 586, shown in FIG. 7. The lever 586 is supported in the transmission housing 572 for pivotal movement about a fulcrum point (not shown) in a well known manner. The inner end of the lever 586 is provided with a fork the fingers 587 of which are engaged in a groove 588 provided on the couplet 580. Positioning of the lever 586 in one position will effect movement of the couplet 580 into the position wherein the pinion 581 is in meshing engagement with the idler gear 583 and operates to drive the input bevel gear 557 in a direction opposite to the direction in which the input bevel gear 556 is being driven.

The positive or negative drive thereby operates to effect rotation of the pulser shaft 552 at a rate which will be more or less than the rate of rotation of the reference drive gear 562 depending upon the direction of desired feed motion. The input to the differential 550 through the gear 557 will either add to or subtract from the reference input that is being delivered to the gear 556, depending upon the direction or rotation of the gear 557. If the gear 557 is rotating in the same direction as the gear 556 its rotation is added to the rotation of the gear 556 so that the pulser shaft is rotated at a faster rate than is the reference input gear 556. On the other hand, if the gear 557 is rotated in a direction opposite to the direction of rotation of the gear 556 its input is subtracted from the input of the gear 556 so that the pulser shaft will be rotated at a rate that is slower than the rate of rotation of the bevel gear 556.

The feed rate at which the machine tool slide will move along the "Z" axis is established from the rate of rotation of the pulser shaft 552. Since the rate of rotation of the pulser shaft 552 is dependent upon the relative rate of rotation of the two input bevel gears 556 and 557 of the differential 550, by controlling the rate at which the bevel input gear 557 is rotated the rate of rotation of the pulser shaft 552 may be effectively controlled. Therefore, since the bevel gear 557 is driven from the output of the speed changer 575, adjusting the speed changer 575 so as to obtain the desired output therefrom will serve to establish a desired feed rate for the machine tool slide along the "Z" axis. To this end, an adjusting shaft 579, shown in FIG. 12, is provided for adjusting the speed changer 575 and operates to effect a variation in the setting of the speed changer, in a well known manner, so that the output of the "Z" differential mechanism 550 may be varied as desired for varying the rate at which the pulser shaft 552 is rotated. Adjustment of the speed changer 575 is effected by means of a knob 543, shown in FIGS. 2 and 7, which is secured to the outer end of a horizontally disposed shaft 544 rotatably supported in an indicator gear case or box 545. The indicator gear case 545 is similar in all respects to the gear box 480 and 504 associated with the speed changers 118 and 242, respectively. The gear case 545 is screw fastened to the sides of the "Z" axis mechanism housing 551, as shown in FIGS. 2 and 7. The inwardly extending end of the shaft 544 is mechanically connected to rotate the adjusting shaft 579 in the same manner as the shaft 476 is connected to the adjusting shaft 253 of the speed changer 242. Adjustment of the speed changer 575 will effect operation of an indicator shaft 546 which extends outwardly from the speed changer 575 and through the gear case 545. The outer end of the indicator shaft 546 is provided with an indicator dial 547 having unit indicia thereon ranging from the lowest setting of the speed changer 575 to the highest setting, and which is readable against an indicator mark (not shown). A tenths dial 548 and hundredths 555 are also provided, as shown in FIG. 2, so that a setting of the speed changer to a hundredth of a unit will be indicated by the supplementary dials 548 and 555 which are driven by a suitable gear drive (not shown) contained within the gear case 545. The gear drive for the indicator dials 547, 548 and 555 is similar to the gear drive associated with the indicator dials for the speed changer 242, previously described. The indicator dials 547, 548 and 555 are graduated in terms of the setting of the speed changer 575 and not in terms of the feed rate obtained thereby. Therefore, a chart (not shown) is provided and a comparable feed rate in inches per minute is given for every indicator setting. Thus, for a particular feed-rate, reference to the chart (not shown) will give a comparable dial reading and all that is necessary is to actuate the knob 543 until the dials 547, 548 and 555 indicate the proper setting which will yield the desired feed rate.

The output of the pulser shaft 552 is employed in the same manner as are the pulser shafts 387 and 425 to record on the magnetic tape a "Z" channel of variably spaced positive and negative poles to produce variably spaced pulses on playback of the tape from which phase modulated analog voltages may be generated. To this end, the extending end of the shaft 552 is provided with a mechanical pulser disc 597 which is secured thereto for rotation with it. The disc 597 is provided with a cam 598 that is arranged to momentarily open a pair of normally closed switches 601 and 602 that are spaced 180° apart. The switches 601 and 602, shown in FIGS. 7 and 12, are identical to the switches 437 and 438, previously described in detail, and operate to change the state of a "Z" channel electronic flip-flop (not shown) which is identical to the "X" channel electronic flip-flop. The switch 601, when actuated to its open condition, changes the state of the associated flip-flop (not shown) to thereby effect a recording of a positive magnetic pole on the magnetic tape. Conversely, when the switch 602 is opened upon being engaged by the cam 598 of the disc 597, it operates to change the state of the associated flip-flop back to its original state and thereby effect a recording of a negative magnetic pole on the tape.

A counter 603 is provided for the "Z" motion mechanism and it is similar to the counters 467 and 468 in operation and function. As shown in FIG. 12, the "Z" counter 603 is supported on a bracket 604 secured to the rear wall of the housing 551. The counter 603 has an actuating shaft 605 on the outwardly extending end of which is secured a driving gear 606 that is disposed in meshing engagement with the gear 584. Since the gear 584 will rotate with the shaft 591 in either direction as the shaft is rotated to effect an input to the "Z" differential 550 the counter 603 will also be operated to provide the desired indication.

It is therefore apparent that the "Z" axis drive operates independently of the ball transmission 144 since it is actuated from the reference drive which originates with the reference drive shaft 100 that is revolved at a constant rate by the motor 22. As a result, the rate of travel along the "Z" axis is determined solely by the setting of the speed changes 575. After the speed changer 575 is set to yield the desired rate of travel, the recording of information for controlling motion along the "Z" axis is initiated by manipulating the lever 586 in either direction from its neutral position to actuate the "Z" axis drive. The counter 603 is calibrated in terms of inches of movement along the "Z" axis and when the desired distance appears on the counter, the lever 586 will be manipulated to its neutral position to disengage the "Z" axis drive as a sufficient number of pulses will have been recorded on the "Z" channel of the magnetic tape to produce the desired distance of "Z" axis movement upon playback of the record.

For an operational description of the apparatus in which the "Z" axis mechanism will be utilized reference is again made to FIGS. 13 and 15. As there shown, the workpiece 511 is provided with a formed circular recess 660, the wall and bottom surfaces of which are to be machine finished. In the previous description of the operation of the present invention, the recorded information for the "X" and "Y" channels was assumed to control the table and saddle slide members of a machine tool with the cutter carrying machine slide member, such as the spindle head, being positioned manually in the "Z" axis plane. By employing the "Z" axis mechanism of the present invention a recording of information for positioning the cutter carrying machine slide member may also be effected, so that coordinate control of the three slide members representative of a pattern of motion along "X," "Y," and "Z" axes will be recorded on the magnetic tape.

In FIG. 15, a representation of the workpiece shown in FIG. 13 is made, and as shown, the workpiece is supported on the top surface of the table 661 of a machine tool by means of a fixture 662. For the purpose of this description, the top surface of the table 661 will be considered as the reference plane or zero plane for the "Z" axis where the table is maintained vertically immovable. However, any other convenient horizontal plane may be designated as the "Z" axis reference plane since the reference plane is merely an arbitrary plane from which movement of the cutter carrying member will be related. Thus, in order to effect an upward positioning of the cutter to a position above the table surface a positive direction of movement of the cutter carrying slide member will be required. Therefore, the gear couplet 580 must be shifted so that the gear 582 thereof will be in meshing engagement with the gear 584, as shown in FIG. 12. With the gear couplet in this position a positive direction drive will be established which operates to drive the input bevel gear 557 of the "Z" axis differential 550 in the same direction as the reference input bevel gear 556 is driven. The resulting output from the differential will be greater than the reference input so that the frequency of the pulses on the "Z" channel of the magnetic tape is greater than the frequency of the pulses on the reference channel. As a result, on playback, the information being recorded on the magnetic tape serves to effect upward movement of the cutter carrying machine slide member, away from the "Z" axis reference plane.

On the other hand, if it desired to effect movement of the cutter carrying slide member to move the cutter downwardly from a position above the table surface to an intermediate position therebetween, the gear couplet 580 will be shifted rightwardly, as viewed in FIG. 12, to a position wherein the pinion 581 will be in meshing engagement with the idler gear 583. In this position of the gear couplet, a negative direction drive will be established which operates to drive the input bevel gear 657 of the "Z" axis differential 550 in a direction opposite to the direction in which the reference input bevel gear 556 is driven. The resulting output from the differential will be less than the reference input so that the frequency of the pulses on the "Z" channel of the magnetic tape will be less than the frequency of the pulses on the reference channel. As a result, on playback, the information being recorded on magnetic tape serves to effect downward movement of the cutter carrying machine slide member toward the "Z" axis reference plane.

In FIG. 15 the workpiece 511 is shown as having a certain thickness, which for the purpose of this description will be assumed to be three-fourths of an inch. The workpiece is also shown as being supported by a fixture 662 having an assumed vertical dimension of one-half inch. It will also be assumed that the depth of the recess 660 after a finishing operation has been performed on the bottom surface 663 thereof will be three-eighths of an inch and that the diameter of the recess, when finished, will be two inches. A further assumption to be made is that the cutting tool employed for the work operation is a three-quarter inch diameter end mill, which could also be the tool employed for the contouring operation. For the purpose of this description it will also be assumed that the information will be recorded on the basis that the operation will be initiated with the cutter located so that its axis center line is perpendicular to the workpiece 511 and passes through point 9 in FIG. 13 and that the cutting end face thereof is in a horizontal plane that is one-fourth of an inch above the top surface of the table 661, the intersection point being represented in FIG. 15 by the point 9′. In the description a one-fourth of an inch clearance will be maintained for passing the cutter over the workpiece.

Therefore, the initial path of travel to be recorded is along the "Z" axis and is represented in FIG. 15, by the line extending between points 9′ and 9$z$. Since the motion to be recorded is solely along the "Z" axis, the gears 358 and 396 will be disengaged from the driving change gears 356 and 395, respectively by pivoting the arms 364 and 404 so that the output from the sphere 175 will not be transmitted to the "X" differential 295 nor to the "Y" differential 296 and there will be no motion input to them. The coordinates of point 9$z$ as determined from the chart of FIG. 14 are $X=0.0000$, $Y=4.2500$ and $Z=1.5000$ and the chart also indicates that motion along the "Z" axis is in a positive direction. The lever 586 will be actuated to move the gear couplet 580 to the position shown in FIG. 12, to thereby establish a positive direction drive to the input bevel gear 557 of the "Z" axis differential 550. The feed rate along the "Z" axis is to be at a rate of forty-five inches, therefore the speed changer 575 will be adjusted to effect the desired rate by manipulating the adjusting knob 543 as previously described until the indicating dials on the gear box 545 indicate a reading which corresponds to the desired feed rate of forty-five inches as determined from the comparison chart (not shown). Since the output from the sphere 175 has been disconnected from the "X" and "Y" differentials 295 and 296 the apparatus is now conditioned for a "Z" axis recording operation. The motor 22 will be operated until just prior to when the "Z" axis counter 603 registers a reading of 1.5000 as called for by the chart of FIG. 14 for the point 9$z$. The final reading is obtained by manual operation of the handwheel 91 as in the case of the "X" and "Y" axes readings.

In addition, operation of the motor 22 operates the tape capstan drive to move the tape across the recording head 44 and also operates to effect a reference motion input to the "X" axis differential 295 and "Y" axis differential 296, which thereby operate their respective mechanical pulsers 435 and 455 and thereby the cooperating flip-flops or square wave generators to effect a recording of pulses on the "X" and "Y" channels of the magnetic tape. However, since there is no input to the differentials 295 and 296 from the ball transmission 144, the frequency of the pulses recorded on the "X" and "Y" channels of the magnetic tape will correspond to the frequency of the pulses on the reference channel to indicate that there is no motion along the "X" and "Y" axes. Operation of the motor 22 and the handwheel 91 will also operate to effect operation of the reference mechanical pulser 461 and thereby actuate its associated square wave generator to record a reference motion on the reference channel of the tape. As the gear 426 associated with the differential 295 is driven to effect a reference motion input to the differential it also operates to drive the gear 562 through the idler gear 561 to effect a reference motion input to the "Z" differential 550. The gear 562, in turn, effects an input motion to the speed changer 575 through the "Z" axis reduction transmission 549. The output of the speed changer 575 is transmitted, by means of the gears 582, 584, 592 and 593, to the bevel input gear 557 of the "Z" axis differential 550. The two input motions are summated by the differential 550 into an output which actuates the "Z" mechanical pulser 597 and thereby operate the associated "Z" axis square wave generator to record on magnetic tape a "Z" channel of information. The information recorded on the "Z" channel of the tape will serve, upon playback of the tape, to effect a positioning of the cutting end face of the end mill carried by the third machine slide member in a plane which is 1.5000 inches above the surface of the machine table 661 which has been designated as the "Z" axis zero reference point.

When the final reading on the "Z" counter 603 registers 1.5000, by operation of the handwheel 91, its operation will be discontinued. At this time, the gears 358 and 396 will be again engaged with their respective driving change gears 356 and 395 to connect the power take-off wheels 188 and 189 to their respective differentials 295 and 296. Referring again to FIGS. 13 and 15, it will be seen that the next cutter center line path of travel is angularly across the workpiece along the line extending between the points 9z and 10, the end cutting surface of the cutter having been programmed for location in a horizontal plane located one-fourth of an inch above the surface of the workpiece. Since the cutter is now located at the desired vertical height, the movements of the other two machine slide elements need only be coordinated to effect the cutter travel represented by the line 9z–10, shown in FIG. 15. Therefore, the lever 586 will be actuated to shift the gear couplet 580 of the "Z" axis mechanism to a neutral position so that no "Z" axis motion will be transmitted to the "Z" differential mechanism 550.

Since the path of travel to be recorded is a straight line, the slope of which is 32.32°, the direction clutch shaft 217 is retained in its neutral position and the steering shaft 260, after releasing the brake 515, is rotated so as to orientate the drive wheel 161 to the desired position of 32.32°. The position of the steering wheel 161 is indicated by the indicator 513 which indicates a setting in degrees, and the dial 510 which indicates tenths of degrees and is readable against the vernier 509 to the hundredth of a degree. Such positioning of the drive wheel 161 will serve to cause the ball transmission to distribute its output amongst its two components in such relationship to record information, which on playback, will produce a combined movement along the "X" and "Y" axes at rates of travel that will effect movement of the cutter relative to the workpiece along the line 9z–10. When the desired positioning of the steering wheel 161 has been accomplished, the brake 515 is reset to maintain the drive wheel in the orientated position.

For descriptive purposes it will be assumed that the feed rate desired continues to be forty-five inches per minute, and therefore, since the speed changer 118 has been previously set to yield this feed rate there is no need to make any adjustment to the speed changer 118. The base motor 22 is now operated until just prior to when the "X" counter 467 indicates a reading of 3.3750 and the "Y" counter 468 indicates a reading of 7.0000, these readings being the coordinates of point 10 along the "X" and "Y" axes, as shown in the chart of FIG. 14. Final readings are obtained by manual operation of the handwheel 91, which readings will be arrived at simultaneously by virtue of the setting of the drive wheel 161. At this point, operation of the handwheel 91 will be discontinued. As shown in FIG. 15, the next path of travel to be recorded is from point 10 which is located in a plane above the surface of the workpiece 511, to point 10z where point 10z is in the plane of the desired finished bottom surface of the recess 660, as shown in FIG. 15. Thus, it is only necessary that information be recorded for movement along the "Z" axis. To this end, the input from the take-off wheels 188 and 189 to the "X" and "Y" differential mechanisms 295 and 296 will again be interrupted by pivoting the arms 364 and 404 to disengage the gears 358 and 396 from the gears 356 and 395, respectively.

Since the direction of motion in the plane of the "Z" axis is negative or downwardly, the lever 586, FIG. 7, will be actuated to shift the gear couplet 580 rightwardly so that the pinion 581 is in meshing engagement with the idler gear 583 to thereby establish a negative direction drive to the input bevel gear 557 of the differential 550. As determined from the chart of FIG. 14, the rate of movement is at forty-five inches and since the speed changer 575 had been previously set to obtain this rate there is no necessity to make any adjustment thereto. The base motor 22 is then operated until just prior to when the "Z" axis counter 603 indicates a reading of 0.8750 which is the "Z" coordinate for the point 10z as indicated in the chart of FIG. 14. The final reading of 0.8750 on the "Z" axis counter 603 is obtained through operation of the handwheel 91. Since there has been no motion input to the "X" and "Y" differential mechanisms 295 and 296 from the ball transmission 144, the "X" and "Y" counters 467 and 468 will continue to indicate the readings of 3.3750 and 7.0000, respectively, these being the "X" and "Y" coordinates. During this interval of operation there will have been recorded on the "Z" axis channel of the magnetic tape information which, on playback, will effect a movement of the cutter carrying slide member so that the cutting end of the cutter will have been positioned in the horizontal plane of the finished surface 663, as shown in FIG. 15. At the same time the axial center line of the cutter will coincide with a line that passes through point 10 and is perpendicular to the plane of the workpiece 511. Thus, the cutter will be positioned so as to perform a work operation on the vertical wall of the recess and the base or bottom surface thereof simultaneously.

The next center line path of travel to be recorded is the circle 664 starting at point 10, as viewed in FIG. 13, the radius of which is 0.6250 inch. It will be assumed that the desired direction of travel in this step of the operation will be clockwise. With the position of the cutter established along the "Z" axis, information for the "X" and "Y" axes only need be recorded since the coordinated movement of the two slide members along these two axes in sine-cosine relationship are required to effect a circular center line path of travel of the cutter which will produce the desired diameter of two inches for the circular recess 660. With no "Z" axis motion necessary the couplet 580 will be shifted to a neutral position to interrupt the "Z" motion input to the differential 550.

The directional clutch shaft 217 is moved downwardly so as to effect meshing engagement of the gear 216 with the drive gear 215 and the idler gear 221 and thereby establish a power drive connection from the base motor 22 to the steering transmission in a clockwise direction for the purpose of revolving the axis of the steering wheel 161 at a constant rate to produce the desired radius. The radius of the circle, which will be generated by a three-quarter inch diameter cutter which has its axial center line passing through the point 10z, as shown in the chart of FIG. 14, is stated to be 0.6250 inch, therefore, the rate changer 242 is adjusted to a setting which will effect this desired radius. The setting for the rate changer 242 is determined from the equivalency chart (not shown), as previously described. Since the work operation is to be performed at a rate of forty-five inches which has been previously set on the speed changer 118 no adjustment of the speed changer is necessary. It is now only necessary to release the brake 515 so that continuous steering of the drive wheel 161 may be accomplished. With the apparatus thus conditioned, the base motor 22 will be operated until just prior to when the "X" counter 467 indicates a reading of 3.3750 and the "Y" counter 468 indicates a reading of 7.0000. The final readings are obtained by operation of the handwheel 91. Since the counters 467 and 468 indicate these readings from the previous recording operation, the mechanism will be operated until these readings are again indicated on the respective counters to indicate that the original setting has been arrived at and the traverse of the circle has been completed. When the counters 467 and 468 again indicate the final reading of the coordinates of point 10, operation of the handwheel 91 will be discontinued. The "X" and "Y" channels of information recorded on the magnetic tape during this operational interval will effect on playback, a pattern of motion to generate the desired circular path of travel of the workpiece relative to the cutter.

In order to complete the finishing operation on the bottom surface of the recess 660 it will be necessary to effect a positioning of the cutter so that its axial center line will coincide with the axis of the recess. Thus, a center line path of travel must be effected between points 10*z* and 11, where 11 represents a point through which the axis of the recess and the plane of the finished bottom surface thereof passes. This center line path of travel is from the point 10*z* to the point 11, as viewed in FIG. 15, and is parallel to the "X" axis, therefore, the slope of the line is 0°. Therefore, the directional clutching shaft 217 will be moved to its intermediate or neutral position to disconnect the steering transmission from the motor 22. The steering wheel 161 will be orientated by manually actuating the shaft 260 to effect a positioning of the steering wheel at 0°. With the steering wheel 161 orientated, the brake 515 will be set and the base motor operated until just prior to when the "X" counter 467 indicates the desired "X" axis coordinate of 4.0000 for point 11 as determined from the chart of FIG. 14. The final reading is obtained through the operation of the handwheel 91, as in the previous cases. Since the steering wheel 161 is orientated to 0° the output from the sphere 175 will be at a maximum to the "X" take-off wheel 188 with no output being effected to the "Y" take-off wheel 189. Thus, there will be no "Y" motion input to the "Y" differential 296 and therefore the indication on the "Y" counter 468 will remain as it existed upon completion of the previous operation.

The next information to be recorded is the withdrawal of the tool from the recess to a point above the surface of the workpiece 511, which, as viewed in FIG. 15, represents a path of travel along the "Z" axis and is represented by the line between point 11 and point 11*z*. Thus, no motion input will be required to the "X" and "Y" differentials 295 and 296 from the ball transmission 144. Therefore, the gears 358 and 396 will be disconnected from their driving change gears 356 and 395, respectively, by pivoting the arms 364 and 404. Since the direction of movement along the "Z" axis is in an upward or positive direction, the gear couplet 580 will be shifted to the position shown in FIG. 12, to establish a positive direction drive to the "Z" differential 550. The retraction will be at the rate of forty-five inches per minute, as indicated in the chart of FIG. 14, therefore adjustment of the speed changer 575 is not necessary as it has been previously adjusted to obtain the desired rate from the previous operation. The base motor 22 is now operated until just prior to when the "Z" axis counter 603 indicates a reading of 1.5000, which is the "Z" axis coordinate of the point 11*z*, at which time the operation of the base motor 22 will be stopped and the final reading being obtained by operating the handwheel 91. There has now been recorded on the "Z" channel of the magnetic tape information to effect retraction of the tool from the workpiece so that its cutting end will be located in a plane one and one-half inches above the top surface of the table 661.

It is now necessary to effect a path of travel to return the cutting tool to the original starting point, the path being represented in FIG. 13 by the line extending between points 11 and 1. To record information for effecting this path of travel, the take-off wheels 188 and 189 must be connected to effect input motion to the differentials 295 and 296. Thus, the gears 358 and 396 are reengaged with their respective driving gears 356 and 395. The steering actuating shaft 260 is now rotated to effect a positioning of the steering wheel 161 to a setting of 240.27°, this being the slope of the line 11–1, as indicated by the chart of FIG. 14. The gear couplet 580 will be shifted to its neutral position, since no "Z" axis motion is required. The base motor 22 is now operated until just prior to when the "X" axis counter 467 indicates a reading of 0.0000 and the "Y" axis counter indicates a reading of 0.0000 when operation of the base motor 22 will be discontinued and the handwheel 91 operated to effect the desired final readings. Thus, the information which has been recorded will effect a return of the cutting tool to its starting position.

However, the end cutting surface of the tool will be one and one-half inches above the top surface of the table 661 and it may be desired that the end cutting surface of the tool be repositioned to its original location in the horizontal plane which is 0.2500 inch above the top surface of the table. To this end, the drive from the take-off wheels 188 and 189 to the differentials 295 and 296 will be disconnected by disengaging the gears 358 and 396 from their respective driving gears 356 and 395. The gear couplet 580 will be shifted to effect meshing engagement of the pinion 581 with the idler gear 583 and this establishes a negative direction drive to the "Z" differential 550. The negative direction drive is established for the reason that the direction of movement of the cutter carrying slide member will be downwardly. With negative direction drive established, the motor 22 will be operated until just prior to when the "Z" axis counter 603 indicates a reading of 0.2500 which is the "Z" axis coordinate desired when operation of the motor 22 will be discontinued and the handwheel 91 operated to obtain the final desired reading. Thus, a record has been completed that will, upon playback, effect a continuous path of movement for reproducing finished workpieces which will be an exact reproduction of the pattern or drawing from which the information was obtained.

It is therefore apparent that mechanism has been provided whereby an additional channel of intelligence may be recorded on magnetic tape, namely, a "Z" channel which will function to control motion of a machine slide member along a third axis. This third axis of recorded information is also related to the reference channel and the machine slide member controlled thereby will respond in synchronization with the members controlled by the "X" and "Y" channels.

The apparatus set forth above is operable to record information on magnetic tape for controlling machine slide members along three orthogonal axes where the geometry of the workpiece is a composite of straight lines and curves of constant radii. However, certain workpieces may include a sine curve which is required to be machined in their surfaces. While the apparatus is operable for recording information for controlling machine slide members to effect a path of cutter travel to generate a curve where the curve to be generated is a true circle or a portion thereof, a curve other than a circle, must be recorded in increments where the increments are taken as portions of a circle. Thus, a curve which is not a circle will be a summation of approximated curves composed of incremental arcs the length of which are dependent upon the characteristics of the curve as well as allowable tolerances. The approximated curved surface is sufficient for most workpieces and the accuracy of the surface can be held so as to fall within allowable tolerances. However, some workpieces such as cams may have curved surfaces which are sine curves or portions thereof. The method of approximation for this type of curve, of course, would require a great number of incremental sections in order to generate the desired surface. Therefore, mechanism has been provided whereby information may be recorded on magnetic tape for controlling machine slide members in a path to produce a configuration which is in the form of a sine curve either along the "X" axis or the "Y" axis.

To record information which is representative of a sine curve along the "X" axis, it is necessary that data be recorded on the "X" channel of the magnetic tape so that on playback a resultant constant movement of the associated machine tool slide along the "X" axis will occur. It is also necessary that information be recorded on the "Y" channel of the tape so that on playback a resultant varying motion along the "Y" axis of the machine slide associated with this channel will occur. Since the axis of rotation of the sphere 175 of the resolver 144 is capable of being constantly varied by bodily rotating the drive wheel 161 at a rate determined by the rate changer 242, the output from the sphere 175 to the take-off wheels 188 and 189 will be a constantly varying output with the variation occurring at a predetermined rate. Therefore, if the drive from the take-off wheel 188 to the "X" differential 295 is disconnected and only the varying input from the resolver 144 to the take-off wheel 189 be employed, the information recorded on the "Y" channel will be the information necessary to effect a varying motion of the machine slide along the "Y" axis. Since the take-off wheel 188 has been disconnected from the differential 295, a constant motion transmission 370, as diagrammatically shown in FIG. 11, is provided which is operable to effect a constant "X" input motion to the differential 295 and which may be conveniently connected to be driven from the motor 22. The rate of the constant "X" input motion obtained through the mechanism 370 may be established by adjusting the speed changer 118 to a desired setting, as previously described. Thus, assuming that the recording of data to produce a sine curve is initiated with the axis of rotation of the drive wheel 161 orientated 90° from the axis of rotation of the take-off wheel 189, operation of resolver 144 while the driving wheel 161 is rotated bodily through 360° will result in information being recorded on the "Y" channel which on playback, will effect movement of the corresponding machine slide along the "Y" axis in a positive direction from a minimum to a maximum distance away from the "X" axis, and then return toward the "X" axis from a maximum to a minimum distance from the "X" axis. The movement of the slide will then continue in a negative direction from a minimum to a maximum distance away from the "X" axis, and return toward the "X" axis from a maximum to a minimum distance from the "X" axis. The maximum travel from the "X" axis is established by the setting of the rate changer 242. Simultaneously therewith the constant feed rate information recorded on the "X" channel by operation of the constant motion transmission 370 will, on playback, result in a movement of the machine slide associated with the "X" channel, at a constant rate along the "X" axis. Thus, the combined movement will produce a sine curve, the maximum sinusoidal ordinate of which is established by the setting of the rate changer 242.

Such mechanism comprises a bevel gear 611 mounted on the shaft 128, FIGS. 3, 5, 7 and 11, the bevel gear 611 being in meshing engagement with a pair of bevel gears 612 and 613. The bevel gear 612 is fixedly secured to the inner end of a horizontally disposed shaft 614 rotatably supported in the main casting 24. The outwardly extending end of the shaft 614 is journalled in an outer wall 615 of the differential support 321 and has mounted thereon a positive direction drive gear 616 which is normally in meshing engagement with an intermediate gear wheel 617. The drive gear 616 is slidably splined on the shaft 614, as shown in FIG. 5, and is axially movable thereon out of and into meshing engagement with the gear wheel 617, in a well known manner, such as by means of a shifter fork (not shown).

A reversing drive is provided for rotating the gear 617 in the opposite direction and comprises a reversing drive gear 618 fixed on the shaft 614 for rotation with it. A gear couplet 619 slidably splined on an intermediate shaft 620 journalled in the differential support 321, is movable axially in well known manner such as by means of a shifter fork (not shown) to effect engagement of a gear 622 of the couplet with the reversing drive gear 618. Thus, whenever the gear 616 is moved into meshing engagement with the gear 617, the gear couplet 619 will be moved to a disengaged position, as shown in FIG. 5, to thereby establish a drive from the base motor 22 in a direction which is referred to as a "positive drive." A "negative drive" will be established by moving the gear 616 out of engagement with the gear 617 and moving the gear couplet 619 axially so as to mesh the gear 621 with the gear 617 and the gear 622 with the reversing drive gear 618.

The "positive drive" and "negative drive" are provided so that a sine curve along the "X" axis in a positive direction, or a negative direction may be generated as desired.

The gear wheel 617 is supported on a stub shaft (not shown) journalled in the front wall of the differential support 321 and is disposed in meshing engagement with a transfer gear 626, shown in FIGS. 7 and 11. The transfer gear 626 is secured to the inner end of a transfer shaft 627 that is journalled in an elongated hollow bearing support 628, shown in FIG. 5. The bearing support 628 is mounted in the outer wall of the differential casting 321 in a suitable opening provided therein and extends outwardly thereof to provide support for the outwardly extending end of the transfer shaft 627. The outwardly extending end of the transfer shaft 627 is provided with a gear 629 which operates to impart the drive from the base motor 22 to the fixed gear portion of the "X" input transmission to the "X" differential mechanism 295.

To effect a drive connection between the fixed gearing portion of the "X" input transmission and the constant "X" motion drive transmission, the rotatable shaft 363 in the movable arm 364 has an outwardly extending end on which is secured a clutching gear 630. Thus, by pivoting the arm 364 downwardly, the clutching gear 630 will be moved into meshing engagement with the gear 629, while the clutching gear 358 will be moved out of engagement with the change gear 356. In moving the gear 358 out of engagement with the gear 356 the arm 364 will effect an orbital movement of the gear 358 about the gear 357 while maintaining the meshing engagement between them. The arm 364 may be maintained in its lowermost position wherein the clutch gear 630 is meshed with the transfer gear 629 by disconnecting the end of the spring 366 from the post 368 and connecting it to a post 631 provided for this purpose in the wall of the differential support 321, as indicated in broken lines in FIG. 7. In the lowermost position of the arm 364 the "X" output drive from the sphere 175 to the "X" differential 295 is interrupted and a constant motion from the base motor 22 to the input gear 386 of the "X" differential 295 is established.

In order to effect a recording of information of a sine curve along the "X" axis, the drive from the take-off wheel 188 to the input bevel gear 386 of the differential 295 will be interrupted by removing the end of the spring 366 from the post 368 and pivoting the arm 364 downwardly so as to mesh the gear 630 with the transfer gear 629, shown in FIGS. 7 and 11, while maintaining the gear 358 in meshing engagement with the gear 357. The disconnected end of the spring 366 will then be engaged on the post 631, to insure positive engagement of the gear 630 with the transfer gear 629. It will be assumed that the sine curve to be generated will be along the "X" axis and in a positive direction. Therefore, the gear couplet 619 will be moved to a disengaged position and the positive drive gear 616 will be shifted into engagement with the gear 617 to thereby establish a drive from the shaft 128 through the bevel gear 611, the bevel gear 612, the gears 616, 617, 626 and 629 with the latter being connected to drive the gear 630. The constant drive from the motor 22 will continue by means of the gear 358 meshed with the gear 357 which is connected to drive the gear 371. From the gear 371 the drive will continue through the gear 372, the gear 379 meshing with the gear 380 and the gear 384 meshing with the gear 385 which is connected to drive the bevel input gear 386 of the differential 295. Thus, the constant motion input to the bevel gear 386 of the differential 295 from the base motor 22 has been established, and the rate of the input may be varied or set by adjusting the speed changer 118, as previously described.

With the "X" differential 295 receiving a constant motion input from the shaft 128 and a reference input from the shaft 100 the pulser disc 435 will be rotated at a constant predetermined rate which will operate to record on the magnetic tape the "X" channel of information of a constant frequency as determined by the setting of the speed changer 118. Simultaneously, with the operation of the differential 295, the resolver 144 will be operating to drive the take-off wheel 189, the output of which will be utilized to effect an input to the bevel gear 403 of the differential 296. Since the output of the sphere 175 to the take-off wheel 189 must vary sinusoidally, the axis of rotation of the sphere 175 must be rotated at a constant rate while the sphere is operating to drive the take-off wheel 189. Therefore, the clutching shaft 217 is moved to engage the gear 216 with the gears 215 and 221 to effect a steering of the drive wheel 161 as it is rotated to drive the ball 175.

With the differential 295 receiving a constant drive from the motor 22 via the shaft 128 and also a reference drive from the shaft 100, the differential 295 will operate to effect rotation of the pulser disc 435 at a constant rate with the rate depending upon the setting of the speed changer 118. The pulser disc 435 will operate to effect a recording of pulses on the "X" channel of the magnetic tape at a constant frequency. Simultaneously therewith, the sinusoidal output of the ball 175 to the "Y" take-off wheel 189 will operate to drive the "Y" differential mechanism 296 so that the pulser disc 455 associated therewith will be operated to record pulses on the "Y" channel of the magnetic tape at a frequency that varies sinusoidally.

As a prerequisite for the operation of the mechanism set forth, the numerical maximum and minimum points of the desired sine curve as related to the "X" and "Y" coordinates must be established so that the setting of the rate changer 242 may be determined for operating the apparatus for recording data of the sine curve. The setting for the rate changer 242 is determined by subtracting the "Y" ordinate of the minimum point of the desired sine curve from the "Y" ordinate of the maximum point of the desired sine curve and dividing the result by 2. The resultant answer will be the radius desired and by consulting the associated comparison chart (not shown) the proper setting for the rate changer 242 may be readily ascertained. It is now only necessary to set the speed changer 118 to a setting to establish the desired feed rate, determined from the associated comparison chart (not shown) and the numerical description of the starting point and the end point of the curve, the data of which is to be recorded.

In operation, assuming that the drive wheel 161 is orientated in order to drive the sphere 175 so that its axis of rotation is 90° to the axis of rotation of the "Y" take-off wheel 189, operation of the mechanism will start with no output being imparted to the take-off wheel 189. At this time, there will be no "Y" input to the differential 296 but only a reference input of 60 cycles thereto, thus, no machine slide motion along the "Y" axis will be recorded at the instant that the operation is initiated. Simultaneously therewith, the "X" differential 295 is receiving a constant input from the shaft 128 and the reference shaft 100 so that pulses are being recorded on the "X" channel of the magnetic tape at a constant rate. As the operation of the mechanism continues, the drive wheel 161 will be rotated bodily so that the axis of rotation of the sphere 175 will be revolved progressively to a position parallel to the axis of rotation of the take-off wheel 189. At this time, the "Y" take-off wheel 189 will be driven at a maximum speed in the positive direction resulting in a maximum "Y" input to the differential 296 which results in the recording of data on the "Y" channel of the tape corresponding to the maximum point of the desired sine curve.

As the drive wheel 161 was being rotated bodily at a constant rate to vary the axis of rotation of the sphere 175, the rate of rotation of the "Y" take-off wheel was being increased sinusoidally in a positive direction from zero to its maximum rate so that the pulses on the "Y" channel of the record will be recorded at a sinusoidally increasing frequency. As this was occurring, the "X" differential was continuously receiving a constant input from the shaft 128 to record pulses on the "X" channel of the record at a constant frequency. Therefore, on playback, the data recorded on the record will produce a combined movement of the machine tool slides along the "Y" and "X" axis in the proper relationship to produce a resultant path of travel in the form of a sine curve.

As the mechanism continues to operate, the axis of rotation of the sphere 175 will be revolved so that its axis of rotation will be moved at a constant rate to gradually decrease the output to the take-off wheel 189 from maximum to minimum in a negative direction. That is, the axis of rotation of the sphere 175 will be revolved from its position parallel to the axis of rotation of the take-off wheel 189 to a position 90° therefrom so that the speed of the take-off wheel 189 will be gradually reduced from maximum to minimum. At this point in the operation there will have been recorded data which corresponds to one-half of the full sine curve, starting from a zero point on the "X" axis to the maximum point of the sine curve and back to the "X" axis. Continued operation of the mechanism will result in the recording of data for the other one-half of the desired sine curve. That is, the axis of rotation of the sphere will be continued to be orientated so that the axis of the rotation of the sphere will be moved from a position 90° to the axis of rotation of the take-off wheel 189 to a position parallel to it. At this time, the take-off wheel 189 will be driven at maximum speed in the opposite or negative direction and the data recorded on the tape will correspond to the minimum point of the sine curve desired. As the rotation of the sphere continues the axis of rotation of the sphere will be positioned into its initial starting position so that it is 90° to the axis of rotation of the take-off wheel 189 and the take-off wheel 189 will then become stationary. Thus, data for a full sine curve along the "X" axis will have been recorded and the coordinates of the end point of the curve will be indicated on the "X" counter 467 and the "Y" counter 468, as previously described.

A "Y" constant motion transmission is also provided which is the same in all respects as the "X" constant motion transmission and is shown schematically in FIG. 11, and partially in FIG. 5. As there shown, the bevel gear 613 is secured to the end of a horizontally disposed shaft 636 rotatably supported in the main casting 24. A positive direction drive gear 637 is slidably splined on the outer end of the shaft 636 being axially movable into and out of meshing engagement with a gear wheel 638 by means of a shifter fork (not shown).

A reversing or negative drive is also provided by means of a reversing gear 639 fixed to the shaft 636 for rotation with it. A gear couplet 640 slidably splined on an intermediate shaft 641 journalled in the "Y" differential support 344, is movable axially by means of a shifter fork (not shown) to effect engagement of a gear 642 thereof with the gear 638 and a gear 643 with the reversing drive gear 639.

The positive and negative drive for the "Y" axis sine curve mechanism also makes it possible to generate a sine curve along the "Y" axis in either the positive or negative direction as may be desired.

The gear 638 is disposed in meshing engagement with a transfer gear 644, diagrammatically shown in FIG. 11, secured on a horizontally disposed transfer shaft 645, shown in FIG. 5, journalled in a bearing support 646 mounted in and extending through the outer wall of the "Y" differential support 344. The outer end of the transfer shaft 645 is provided with a gear 647 that is affixed thereto for rotation with it.

A clutching arrangement for effecting a drive connection between the fixed gearing portion of the "Y" input transmission and the constant "Y" motion drive transmission is provided that is identical to the arrangement of the constant "X" motion drive. As best shown in FIGS. 5 and 11, a shaft 651 rotatably supported in the movable arm 404 and on which the clutch gear 396 is mounted is provided with a clutch gear 652. Thus, by pivoting the arm 404 downwardly the clutch gear 652 will be moved into meshing engagement with the transfer gear 647 and the gear 396 will move in an orbit about the gear 397 maintaining meshing engagement therewith to thereby establish a drive connection between the constant "Y" motion transmission and the fixed gearing portion of the "Y" input transmission to the 'Y" differential 296. Simultaneously, the clutch gear 396 will be moved out of engagement with the change gear 395 to interrupt the "Y" output drive from the sphere 175 to the "Y" differential 296.

The spring 406 will operate in the manner of the spring 366 and since its use and construction is identical to that of the spring 366 it is unnecessary to describe it in detail.

From the foregoing detailed description of the illustrative embodiment set forth herein to exemplify the present invention, it will be apparent that there has been provided a novel means for recording a control pattern of motion which represents a continuous path of movement and which may be incorporated in apparatus the components of which are substantially mechanical.

Although the exemplary embodiment of the invention has been described in considerable detail in order to fully disclose a practical working apparatus incorporating the invention, it is to be understood that the particular structure shown and described is illustrative only, and that the various characteristics of the invention may be incorporated in other structural forms without departing the spirit and scope of the invention as defined in the subjoined claims.

The principles of this invention having now been fully explained in connection with the foregoing description, we hereby claim as our invention:

1. The method of recording the movement of the movable members of a machine for performing a specific operation comprising;

resolving a motion representative of a path identified with respect to X and Y coordinates to obtain two sine-cosine related motion components representing the movements of the movable members of the machine;

applying the first of said motion components to produce motion pulses at a frequency corresponding to the value of the first motion component;

applying the second of said motion components to produce motion pulses at a frequency corresponding to the value of the second motion component;

producing reference pulses at a constant frequency; and recording the motion pulses and the reference pulses on a recording medium to form a record;

whereby the record can be played back and the frequencies of the motion pulses may be compared with the constant frequencies of the reference pulses to control the rate and direction of movement of the movable members.

2. The method of recording the movements of the movable members of a machine for performing a specific operation comprising;

resolving a motion representative of a path of travel of machine members to obtain two sine-cosine related variable motion components;

algebraically adding a reference motion of a constant rate to each of the variable motion components to obtain two resultant motions;

applying each of the resultant motions to produce motion pulses at varying frequencies corresponding to the variable values of each of the motion components to represent the motion of the movable machine members;

applying reference motion to produce reference pulses at a constant freqeuncy; and recording all the pulses simultaneously on a recording medium;

whereby the record can be played back and the variable frequencies of the motion pulses may be compared with the constant frequency of the reference pulses to control the rate and direction of movement of movable members.

3. The method of recording a pattern of motion on a recording medium comprising;

resolving a motion representative of a path identified with respect to X and Y coordinates to obtain sine-cosine related motion;

algebraically adding the sine-cosine related motions to a reference motion to obtain a summation of the motions;

coverting the summated motions into electrical pulses at a frequency related to the speed of the motions;

applying the electrical pulses to individual recording sections of a recording head; and simultaneously converting the reference motion into electrical pulses and applying the pulses to another recording section of the recording head;

and moving a recording medium across the recording head at a constant predetermined rate as the pulses are applied to the recording sections of the recording head to record the pulses on different channels of the recording medium for establishing a record of the pattern of motion.

4. The method of recording a pattern on a recording medium comprising;

resolving a motion representative of a path of travel identified with respect to X and Y coordinates to obtain two sine-cosine related variable motions representative of the pattern of motion along X and Y axes;

algebraically adding a reference motion at a constant rate to each of the sine-cosine related variable motions to obtain two resultant motions;

converting each resultant motion into electrical pulses;

converting reference motion into electrical pulses;

simultaneously applying the pulses obtained to separate recording sections of a recording head to effect a recording of the pulses in separate channels on the recording medium for establishing a record of the pattern of motion.

5. The method of recording on magnetic tape or plurality of channels of information defining a pattern of motion along X, Y and Z coordinates comprising;

resolving a motion into components representative of path identified with respect to X and Y coordinates comprising feed rate data and data selective representing slope or curvature of obtain two sine-cosine related variable motions;

algebraically adding a reference motion at a constant rate to each of the sine-cosine related variable motions to obtain two resultant motions;

converting the reference motion to obtain a motion which is representative of movement along the Z coordinate;

algebracially adding the representative Z coordinate motion to the reference motion to obtain a third resultant motion;

converting the three resultant motions into electrical pulses at variable frequencies;

converting reference motion into electrical pulses at a constant frequency;

applying the pulses obtained to separate recording sections of a recording head; and, moving magnetic tape across the recording head at a constant predetermined rate so that the pulses supplied to the separate recording sections of the recording head will be recorded on separate channels on the magnetic tape.

References Cited by the Examiner

UNITED STATES PATENTS

| | | | |
|---|---|---|---|
| 2,651,746 | 9/53 | Gano | 318—55 |
| 2,682,045 | 6/54 | Crost | 340—324 |
| 2,755,160 | 7/56 | Holmes | 346—8 |
| 2,755,422 | 7/56 | Livingston | 318—62 |
| 2,882,475 | 4/59 | De Neergaard | 318—162 |
| 2,882,476 | 4/59 | Wetzel | 318—162 |
| 2,882,525 | 4/59 | Young | 343—5 |
| 2,916,342 | 12/59 | De Neergaard | 346—8 |
| 2,926,627 | 3/60 | Demorest et al. | 118—11 |
| 2,937,365 | 5/60 | Peaslee | 340—174.1 |
| 2,939,287 | 6/60 | Capron et al. | 60—97 |
| 2,943,906 | 7/60 | Thomas | 346—33 |
| 2,952,500 | 9/60 | Treschel | 346—17 |
| 2,954,265 | 9/60 | Devaud et al. | 346—33 |
| 2,996,348 | 8/61 | Rosenberg | 346—33 |
| 3,024,396 | 3/62 | Peckjian | 318—162 |
| 3,127,613 | 3/64 | Wetzel et al. | 346—74 |

LEYLAND M. MARTIN, *Primary Examiner.*